(12) United States Patent
Kawasaki

(10) Patent No.: US 12,382,335 B2
(45) Date of Patent: Aug. 5, 2025

(54) USER EQUIPMENT (UE) AND METHOD FOR CONTROLLING CONGESTION

(71) Applicant: SHARP KABUSHIKI KAISHA, Sakai (JP)

(72) Inventor: Yudai Kawasaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 375 days.

(21) Appl. No.: 17/633,766

(22) PCT Filed: Aug. 7, 2020

(86) PCT No.: PCT/JP2020/030436
§ 371 (c)(1),
(2) Date: Feb. 8, 2022

(87) PCT Pub. No.: WO2021/029380
PCT Pub. Date: Feb. 18, 2021

(65) Prior Publication Data
US 2022/0279378 A1 Sep. 1, 2022

(30) Foreign Application Priority Data
Aug. 9, 2019 (JP) ................................. 2019-147897

(51) Int. Cl.
*H04W 28/02* (2009.01)
*H04W 76/20* (2018.01)

(52) U.S. Cl.
CPC ....... *H04W 28/0289* (2013.01); *H04W 76/20* (2018.02)

(58) Field of Classification Search
CPC ................................................ H04W 28/0289
See application file for complete search history.

(56) References Cited

U.S. PATENT DOCUMENTS 10,999,779 B2 * 5/2021 Kim ...................... H04W 76/18
11,558,774 B2 * 1/2023 Jangid ............... H04W 28/0289

OTHER PUBLICATIONS

"3rd Generation Partnership Project; Technical Specification Group Services and System Aspects; System Architecture for the 5G System; Stage 2(Release 16)", 3GPP TS 23.501 V16.1.0 (Jun. 2019).
"3rd Generation Partnership Project; Technical Specification Group Services and System Aspects; Procedures for the 5G System; Stage 2(Release 16)", 3GPP TS 23.502 V16.1.1 (Jun. 2019).

(Continued)

*Primary Examiner* — Yemane Mesfin
*Assistant Examiner* — Jia Hao Deng
(74) *Attorney, Agent, or Firm* — ScienBiziP, P.C.

(57) ABSTRACT

According to an aspect of the present invention, a mobile terminal apparatus and an intra-core network apparatus do not enable congestion control during connection of a mobile terminal apparatus to a non-public network (NPN) in 5GS. Alternatively, during connection of the mobile terminal apparatus to the NPN in 5GS, the mobile terminal apparatus and the intra-core network apparatus enable congestion control only in a public land mobile network (PLMN) specific to the congestion control to provide a congestion control method in an NAS level to the mobile terminal apparatus being connected to the non-public network (NPN) and the intra-core network apparatus in 5GS.

2 Claims, 9 Drawing Sheets

(56) References Cited

OTHER PUBLICATIONS

"3rd Generation Partnership Project; Technical Specification Group Core Network and Terminals; Non-Access-Stratum (NAS) protocol for 5G System (5GS); Stage 3(Release 16)", 3GPP TS 24.501 V16.1.0 (Jun. 2019).

* cited by examiner

USER EQUIPMENT (UE) AND METHOD FOR CONTROLLING CONGESTION

TECHNICAL FIELD

The present application relates to a UE. This application claims the benefit of priority to JP 2019-147897 filed on Aug. 9, 2019, which is incorporated herein by reference in its entirety.

BACKGROUND ART

The 3rd Generation Partnership Project (3GPP), which undertakes activities for standardizing recent mobile communication systems, has studied System Architecture Evolution (SAE) which is a system architecture of Long Term Evolution (LTE).

Additionally, the 3GPP has recently studied next-generation communication technologies and system architectures for a 5th Generation (5G) mobile communication system which is a next generation mobile communication system, and in particular, has standardized a 5G System (5GS) as a system for realizing a 5G mobile communication system (see NPL 1 and NPL 2). In the 5GS, technical problems attributable to connection of various terminals to a cellular network are extracted to standardize solutions.

CITATION LIST

Non Patent Literature

NPL 1: 3GPP TS 23.501 V16.1.0 (2019-06); 3rd Generation Partnership Project; Technical Specification Group Services and System Aspects; System Architecture for the 5G System; Stage 2 (Release 16)

NPL 2: 3GPP TS 23.502 V16.1.1 (2019-06); 3rd Generation Partnership Project; Technical Specification Group Services and System Aspects; Procedures for the 5G System; Stage 2 (Release 16)

NPL 3: 3GPP TS 24.501 V16.1.0 (2019-06); 3rd Generation Partnership Project; Technical Specification Group Core Network and Terminals; Non-Access-Stratum (NAS) protocol for 5G System (5GS); Stage 3 (Release 16)

SUMMARY OF INVENTION

Technical Problem

For 5GS, control signal management based on causes other than congestion control has further been studied in addition to a mechanism for providing a function corresponding to the congestion control (see NPL 1, NPL 2, and NPL 3).

On the other hand, Non-Public Networks (NPNs) have also been studied for 5GS. An NPN is a network which only specific users or UEs are allowed to access or be connected to.

However, whether or not a UE and a network are to apply congestion control of 5GS in a state of being connected to the NPN has not been clarified.

Moreover, in a case that a UE modifies a PLMN in a state where the UE is connected to a NPN and congestion control is applied, and in a case that the PLMN before the modification is a home PLMN, whether or not the congestion control is to be continued in a PLMN to which the UE moves has not been clarified.

The present invention was made in view of such circumstances, and an object thereof is to provide a mechanism and a communication control method for implementing control signal management processing based on a cause for congestion control at the time of changing a system.

Solution to Problem

A User Equipment (UE) according to an embodiment of the present invention is a UE including: a controller; and a transmission and reception unit, wherein in a case that the transmission and reception unit receives a cause value to start a timer for congestion control based on a Data Network Name (DNN) and a back-off timer value, the controller starts the timer using the back-off timer value, the cause value indicates insufficient resources, and the timer is started per DNN and Stand-alone Non-Public Network (SNPN).

A communication control method according to an embodiment of the present invention is a communication control method for a User Equipment (UE), including, in a case that a cause value to start a timer for congestion control based on a Data Network Name (DNN) and a back-off timer value are received, starting the timer using the back-off timer, wherein the cause value indicates insufficient resources, and the timer is started per DNN and Stand-alone Non-Public Network (SNPN).

Advantageous Effects of Invention

According to an aspect of the present invention, a terminal apparatus that constitutes a 5GS and an apparatus in a core network perform processing such as moving management and session management for supporting functions related to a non-public network.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. Overview of System

Figure 1:
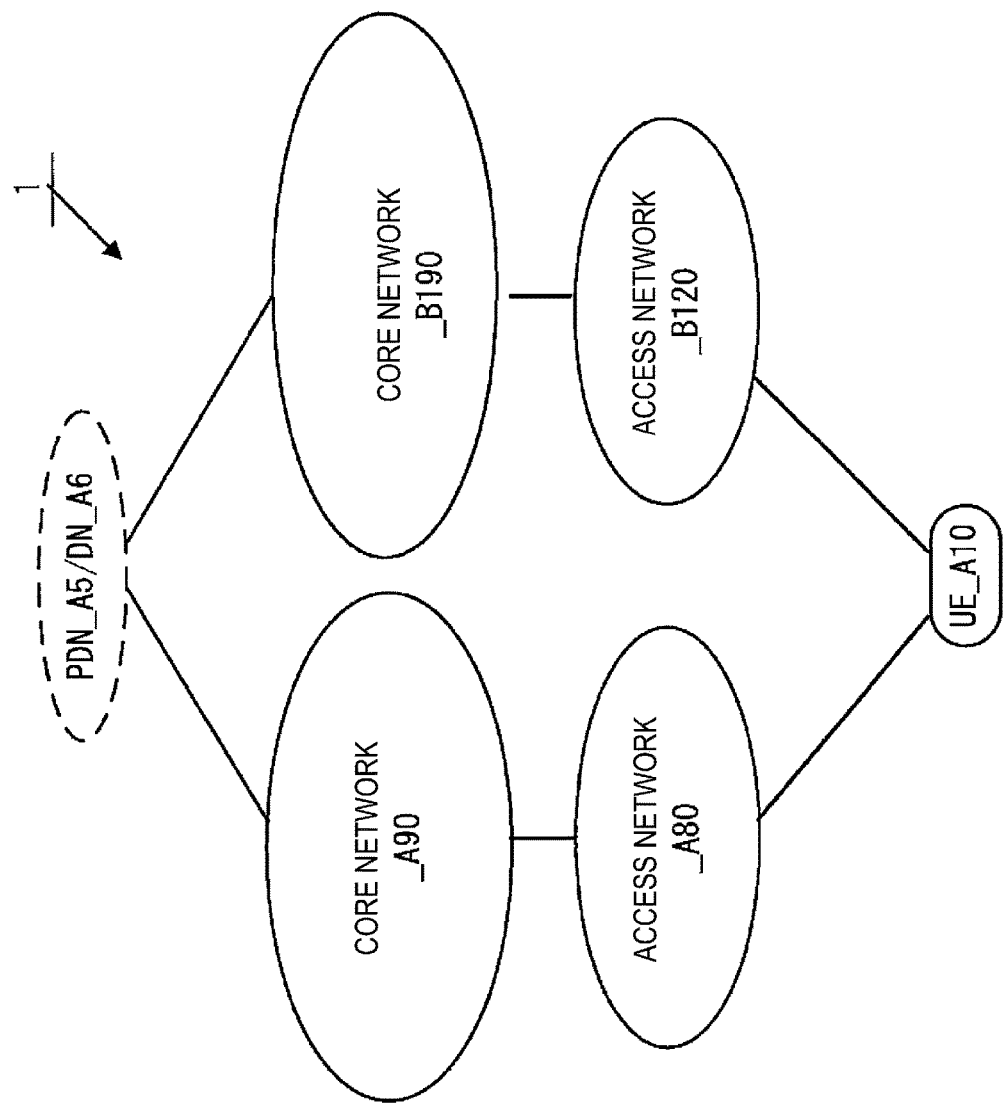
FIG. 1 is a diagram illustrating an overview of a mobile communication system (EPS/5GS).
Figure 2:
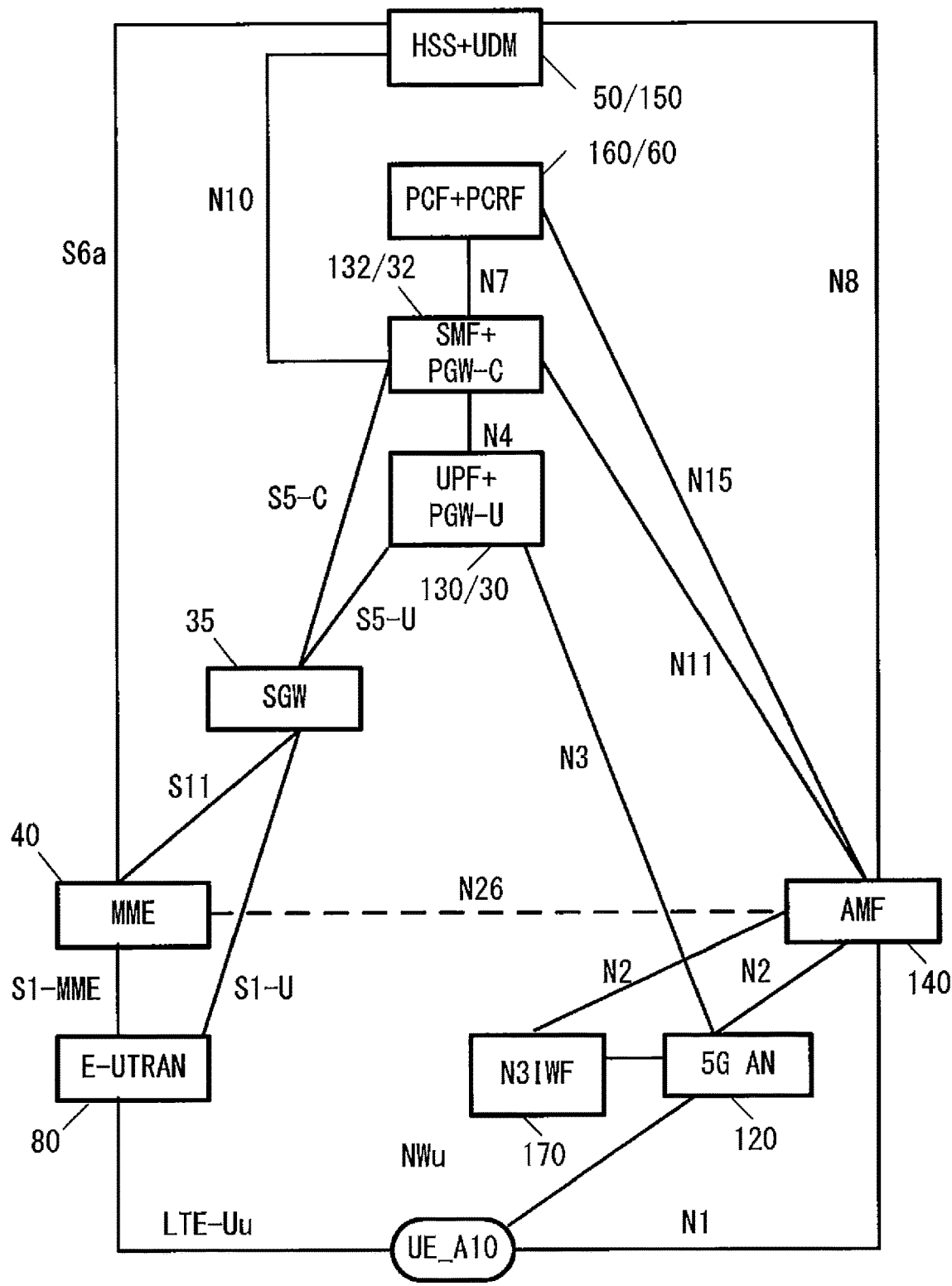
FIG. 2 is a diagram illustrating a detailed configuration of the mobile communication system (EPS/5GS).

First, FIG. 1 is a diagram illustrating an overview of a mobile communication system 1 used in each embodiment, and FIG. 2 is a diagram illustrating a detailed configuration of the mobile communication system 1.

In the illustration of FIG. 1, the mobile communication system 1 includes a UE_A 10, an access network_A 80, a core network_A 90, a Packet Data Network (PDN)_A 5, an access network_B 120, a core network_B 190, and a Data Network (DN)_A 6.

In the following description, the symbols may be omitted, such as in a UE, an access network_A, a core network_A, a PDN, an access network_B, a core network_B, and a DN, in regard to these apparatuses and functions.

Also, FIG. 2 illustrates apparatuses and functions such as a UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and an N3IWF 170, and interfaces for connecting these apparatuses and functions to each other.

In the following description, the symbols may be omitted, such as in a UE, an E-UTRAN, an MME, an SGW, a PGW-U, a PGW-C, a PCRF, an HSS, a 5G AN, an AMF, a UPF, an SMF, a PCF, a UDM, and an N3IWF, in regard to these apparatuses and functions.

Note that an Evolved Packet System (EPS) that is a 4G system includes the access network_A and the core network_A and may further include the UE and/or the PDN. A 5G System (5GS) that is a 5G system includes the UE, the access network_B, and the core network_B and may further include the DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication, such as a mobile phone and a smartphone, and may be a terminal apparatus that can be connected to both the EPS and the 5GS. The UE may include a Universal Integrated Circuit Card (UICC) and an Embedded UICC (eUICC). Note that the UE may be referred to as a user equipment or may be referred to as a terminal apparatus.

The access network_A corresponds to an Evolved Universal Terrestrial Radio Access Network (E-UTRAN) and/or a radio LAN access network. In the E-UTRAN, one or more evolved Node Bs (eNBs) 45 are deployed. Note that in the following description, the symbol of the eNB 45 may be omitted such as in an eNB. In a case that there are multiple eNBs, the eNBs are connected to each other via, for example, an X2 interface. In the radio LAN access network, one or more access points are deployed.

The access network_B corresponds to a 5G access network (5G AN). The 5G AN includes an NG Radio Access Network (NG-RAN) and/or a non-3GPP access network. In the NG-RAN, one or more NR NodeBs (gNBs) 122 are deployed. Note that in the following description, the symbol of the gNB 122 may be omitted, such as in an eNB. The gNB is a node that provides a New Radio (NR) user plane and control plane to the UE, and is a node that is connected to a 5GCN via the NG interface (including the N2 interface or the N3 interface). In other words, the gNB is a base station apparatus newly designed for the 5GS and has functions different from those of the base station apparatus (eNB) used in the EPS that is a 4G system. In a case that there are multiple gNBs, the gNBs are connected to each other via, for example, an Xn interface.

Also, a non-3GPP access network may be an untrusted non-3GPP access network or may be a trusted non-3GPP access network. Here, the untrusted non-3GPP access network may be a non-3GPP access network that is an access network in which security management is not performed, such as public wireless LAN, for example. On the other hand, the trusted non-3GPP access network may be an access network defined by 3GPP and may include a trusted non-3GPP access point (TNAP) and a trusted non-3GPP Gateway function (TNGF).

In the following description, the E-UTRAN and the NG-RAN may be referred to as 3GPP access. The radio LAN access network and the non-3GPP AN may be referred to as non-3GPP access. The nodes deployed in the access network_B may also be collectively referred to as NG-RAN nodes.

In the following description, the access network_A, and/or the access network_B, and/or an apparatus included in the access network_A, and/or an apparatus included in the access network_B may be referred to as an access network or an access network apparatus.

The core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

The core network_B corresponds to a 5G Core Network (5GCN). In the 5GCN, an Access and Mobility Management Function (AMF), a User Plane Function (UPF), a Session Management Function (SMF), a Policy Control Function (PCF), a Unified Data Management (UDM), and the like are deployed. Here, the 5GCN may be referred to as a 5GC.

In the following description, the core network_A, and/or the core network_B, an apparatus included in the core network_A, and/or an apparatus included in the core network_B may be referred to as a core network, a core network apparatus, or an intra-core network apparatus.

The core network (the core network_A and/or the core network_B) may refer to an IP mobile communication network operated by a mobile communication operator (Mobile Network Operator MNO)) connecting the access network (the access network_A and/or the access network_B) and the PDN and/or the DN, may refer to a core network for a mobile communication operator that operates and manages the mobile communication system 1, or may be a core network for a virtual mobile communication operator and a virtual mobile communication service provider such as a Mobile Virtual Network Operator (MVNO) and a Mobile Virtual Network Enabler (MVNE).

FIG. 1 illustrates a case that the PDN and the DN are the same; however the PDN and the DN may be different. The PDN may be a Data Network (DN) that provides communication services for the UE. Note that the DN may be configured as a packet data service network or may be configured for each service. In addition, the PDN may include a connected communication terminal. Thus, "to be connected to the PDN" may mean "to be connected to a communication terminal and a server apparatus deployed in the PDN". In addition, "to transmit and/or receive user data to and/or from the PDN" may mean "to transmit and/or receive user data to and/or from a communication terminal and a server apparatus deployed in the PDN". Note that the PDN may be referred to as a DN, and the DN may be referred to as a PDN.

In the following, at least some of the access network_A, the core network_A, the PDN, the access network_B, the core network_B, and the DN, and/or one or more apparatuses included in these may be referred to as a network or a network apparatus. In other words, the expression that "the network and/or the network apparatus transmits and/or receives a message and/or performs a procedure" means that "at least some of the access network_A, the core network_A, the PDN, the access network_B, the core network_B, and the DN, and/or one or more apparatuses included in these transmit and/or receive a message and/or perform a procedure".

The UE can be connected to the access network. The UE can be connected to the core network over the access network. In addition, the UE can be connected to the PDN or the DN over the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, the IP communication refers to data communication using the IP, and data is transmitted and/or received using IP packets. The IP packet includes an IP header and a payload part. In the payload part, data transmitted and/or received by the apparatuses and functions included in the EPS and the apparatuses and functions included in the 5GS may be included. The non-IP communication refers to data communication not using the IP, and data is transmitted and/or received in a form different from the structure of the IP packets. For example, non-IP communication may be data communication implemented through transmission and/or reception of application data not to which an IP header is not added, or user data transmitted and/or received by the UE may be transmitted and/or received with another header such as a MAC header and an Ethernet (trade name) frame header added.

Also, apparatuses which are not illustrated in FIG. 2 may be configured in the access network_A, the core network_A, the access network_B, the core network_B, the PDN_A, and the DN_A. For example, the core network_A and/or the core network_B may include an Authentication Server Function (AUSF) and an Authentication, authorization, and accounting (AAA) server (AAA-S).

Here, an AUSF is a core network apparatus provided with an authentication function for 3GPP access and non-3GPP access. Specifically, the AUSF is a network function unit that receives an authentication request for 3GPP access and/or non-3GPP access from the UE and performs an authentication procedure.

Also, the AAA server is an apparatus that is connected directly to the AUSF or indirectly to the AUSF via another network apparatus and has authentication, approval, and billing functions. The AAA server may be a network apparatus within the core network. Note that the AAA server may not be included in the core network_A and/or the core network_B and may be included in the PLMN. In other words, the AAA server may be a core network apparatus or may be an apparatus outside the core network. For example, the AAA server may be a server apparatus within the PLMN managed by a third party.

Note that although each of the apparatuses and functions is illustrated one by one for simple illustration in FIG. 2, multiple similar apparatuses and functions may be configured in the mobile communication system 1. Specifically, multiple apparatuses and functions such as the UE_A 10, the E-UTRAN 80, the MME 40, the SGW 35, the PGW-U 80, the PGW-C 32, the PCRF 60, the HSS 50, the 5G AN 120, the AMF 140, the UPF 130, the SMF 132, the PCF 160, and/or the UDM 150 may be configured in the mobile communication system 1.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each storage unit (a storage unit_A 340, a storage unit_A 440, a storage unit_B 540, a storage unit_A 640, and a storage unit_B 740) in each apparatus and function to be described later includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. Each storage unit can store identification information, control information, flags, parameters, and the like included in a control message transmitted and/or received in various communication procedures to be described later. Each storage unit may store these pieces of information for each UE. In a case that each storage unit performs interworking between the 5GS and the EPS, each storage unit can store a control message and user data transmitted and/or received to and/or from the apparatuses and functions included in the 5GS and/or the EPS. In this case, not only information transmitted and/or received over the N26 interface but also information transmitted and/or received without using the N26 interface can be stored.

2.1. Apparatus Configuration of UE

Figure 3:
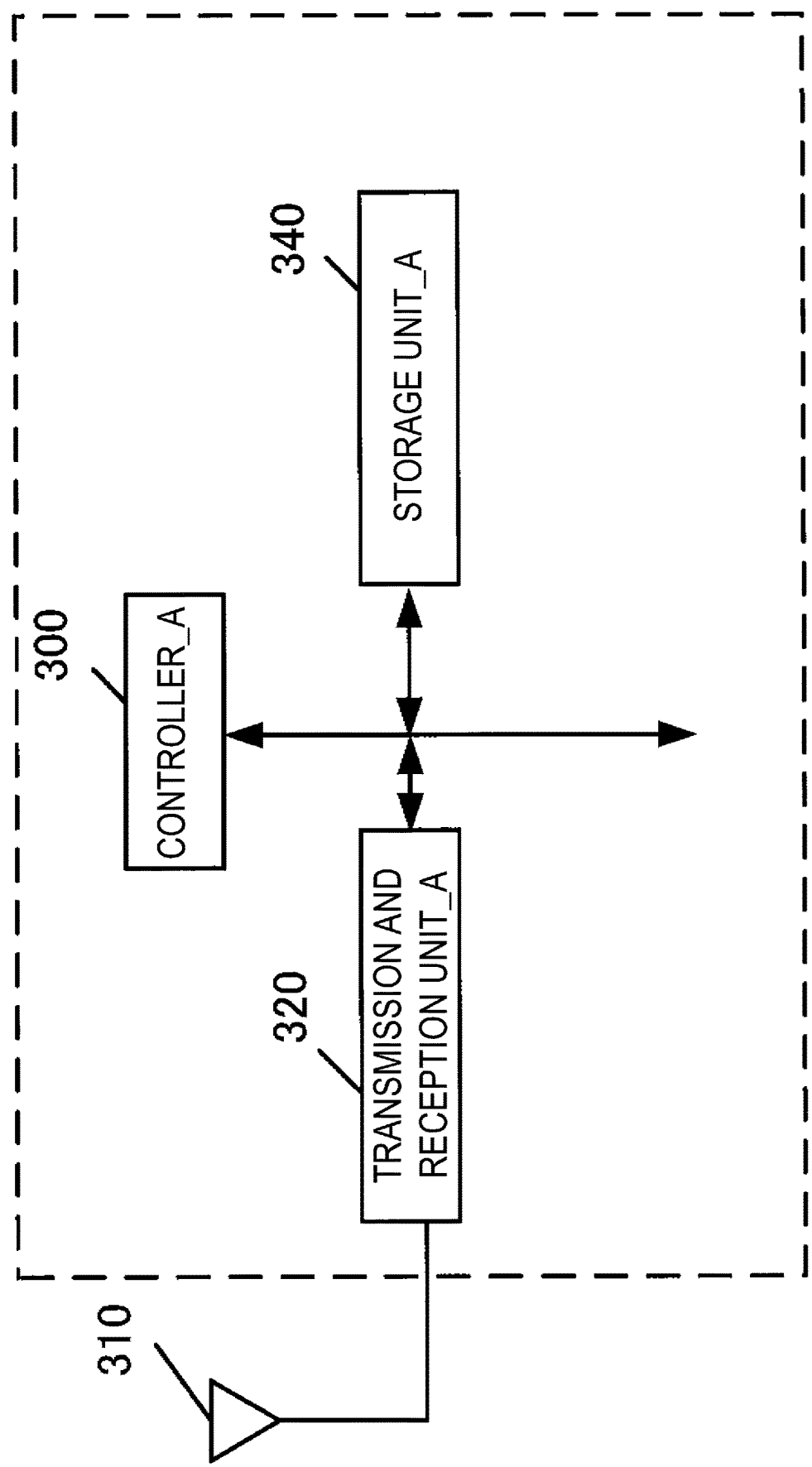
FIG. 3 is a diagram illustrating an apparatus configuration of a UE.

First, an apparatus configuration example of the User Equipment (UE) will be described with reference to FIG. 3. The UE includes a controller_A 300, an antenna 310, a transmission and reception unit_A 320, and a storage unit_A 340. The controller_A 300, the transmission and reception unit_A 320, and the storage unit_A 340 are connected via a bus. The transmission and reception unit_A 320 connects to the antenna 310.

The controller_A 300 is a function unit that controls the entire operations and functions of the UE. The controller_A 300 reads and performs various programs stored in the storage unit_A 340 as necessary, and thereby implements various types of processing in the UE.

The transmission and reception unit_A 320 is a function unit for performing radio communication with the base station apparatus (the eNB or the gNB) in the access network via the antenna. In other words, with the use of the transmission and reception unit_A 320, the UE can transmit and/or receive user data and/or control information to and/or from the access network apparatus, and/or the core network apparatus, and/or the PDN, and/or the DN.

Detailed description is given with reference to FIG. 2. With the use of the transmission and reception unit_A 320, the UE can communicate with the base station apparatus (eNB) in the E-UTRAN over the LTE-Uu interface. The UE can communicate with the base station apparatus (gNB) in the 5G AN with the use of the transmission and reception unit_A 320. The UE can transmit and/or receive a Non-Access-Stratum (NAS) message to and/or from the AMF over the N1 interface with the use of the transmission and reception unit_A 320. Note that the N1 interface is a logical interface, and thus communication between the UE and the AMF is actually performed over the 5G AN.

The storage unit_A 340 is a function unit for storing programs, user data, control information, and the like necessary for each operation of the UE.

2.2. Apparatus Configuration of gNB

Figure 4:
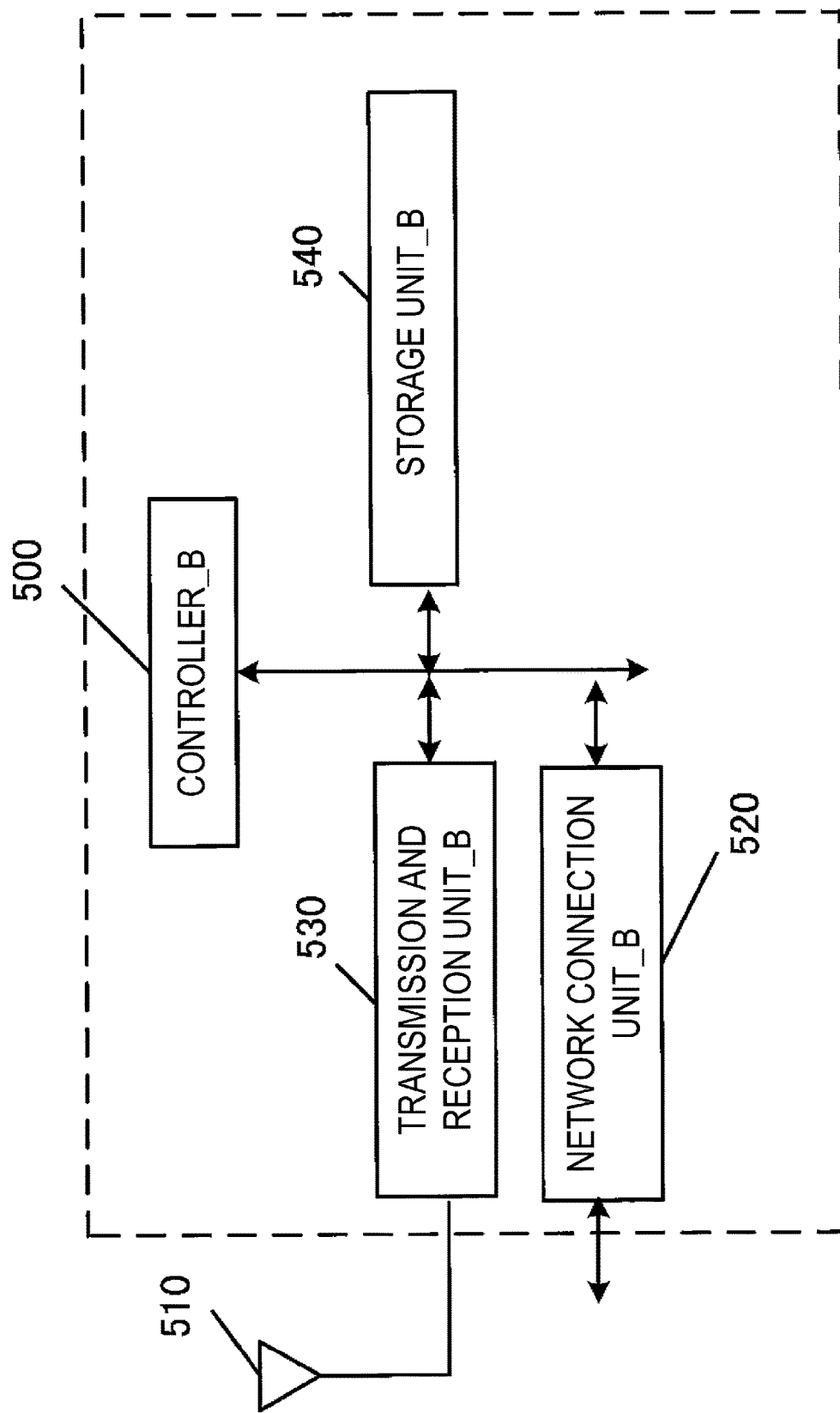
FIG. 4 is a diagram illustrating a configuration of an access network apparatus (gNB) in the 5GS.

Next, an apparatus configuration example of the gNB will be described with reference to FIG. 4. The gNB includes a controller_B 500, an antenna 510, a network connection unit_B 520, a transmission and reception unit_B 530, and a storage unit_B 540. The controller_B 500, the network connection unit_B 520, the transmission and reception unit_B 530, and the storage unit_B 540 are connected via a bus. The transmission and reception unit_B 530 connects to the antenna 510.

The controller_B 500 is a function unit that controls the entire operations and functions of the gNB. The controller_B 500 reads and performs various programs stored in the storage unit_B 540 as necessary, and thereby implements various types of processing in the gNB.

The network connection unit_B 520 is a function unit for the gNB to communicate with the AMF and/or the UPF. In other words, with the use of the network connection unit_B 520, the gNB can transmit and/or receive user data and/or control information to and/or from the AMF and/or the UPF.

The transmission and reception unit_B 530 is a function unit for performing radio communication with the UE via the antenna 510. In other words, with the use of the transmission and reception unit_B 530, the gNB can transmit and/or receive user data and/or control information to and/or from the UE.

Detailed description is given with reference to FIG. 2. With the use of the network connection unit_B 520, the gNB in the 5G AN can communicate with the AMF over the N2 interface and can communicate with the UPF over the N3 interface. The gNB can communicate with the UE with the use of the transmission and reception unit_B 530.

The storage unit_B 540 is a function unit for storing programs, user data, control information, and the like necessary for each operation of the gNB.

2.3. Apparatus Configuration of AMF

Figure 5:
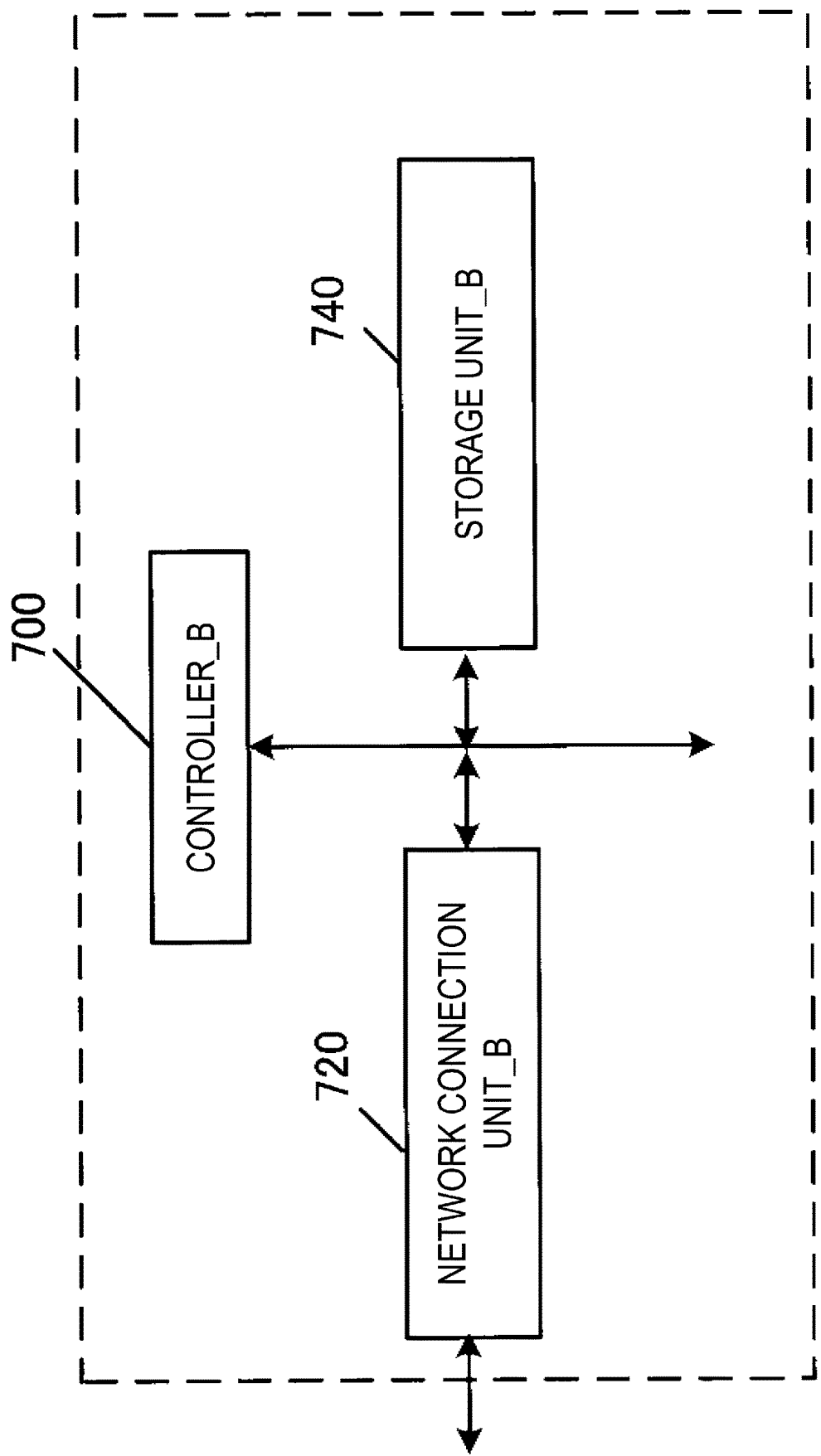
FIG. 5 is a diagram illustrating a configuration of a core network apparatus (AMF/SMF/UPF) in the 5GS.

Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected via a bus. The AMF may be a node that handles the control plane.

The controller_B 700 is a function unit that controls the entire operations and functions of the AMF. The controller_B 700 reads and performs various programs stored in the storage unit_B 740 as necessary, and thereby implements various types of processing in the AMF.

The network connection unit_B 720 is a function unit for the AMF to connect to the base station apparatus (gNB), and/or the SMF, and/or the PCF, and/or the UDM, and/or the SCEF in the 5G AN. In other words, with the use of the network connection unit_B 720, the AMF can transmit and/or receive user data and/or control information to and/or from the base station apparatus (gNB), and/or the SMF, and/or the PCF, and/or the UDM, and/or the SCEF in the 5G AN.

Detailed description is given with reference to FIG. 2. With the use of the network connection unit_A 620, the AMF in the 5GCN can communicate with the gNB over the N2 interface, can communicate with the UDM over the N8 interface, can communicate with the SMF over the N11 interface, and can communicate with the PCF over the N15 interface. The AMF can transmit and/or receive a NAS message to and/or from the UE over the N1 interface with the use of the network connection unit_A 620. Note that the N1 interface is a logical interface, and thus communication between the UE and the AMF is actually performed over the 5G AN. In a case that the AMF supports the N26 interface, the AMF can communicate with the MME over the N26 interface with the use of the network connection unit_A 620.

The storage unit_B 740 is a function unit for storing programs, user data, control information, and the like necessary for each operation of the AMF.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of being unable to reach the UE, because a UE context in the AMF does not have valid location information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is 5GMM-REGISTERED, the UE_A 10 may start transmission and/or reception of user data and a control message, or may respond to paging. In addition, note that, in a case that each apparatus is 5GMM-REGISTERED, the UE_A 10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE_A 10 is not known to the network, or may be a state in which the network is in a state of being unable to reach the UE_A 10. Note that, in a case that each apparatus is 5GMM-DEREGISTERED, the UE_A 10 may initiate the registration procedure, or may perform the registration procedure to thereby establish the 5GMM context.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signaling connection established with the AMF via the N1 interface. In the CM-IDLE state, the UE does not have connection of the N2 interface (N2 connection) and connection of the N3 interface (N3 connection). In contrast, in the CM-CONNECTED state, the UE has NAS signaling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

One or more AMFs may be deployed in the core network_B. The AMF may be an NF that manages one or more Network Slice Instances (NSIs). The AMF may be a common CP function (Common Control Plane Network Function (CPNF) (CCNF)) shared among multiple NSIs.

Note that, in a case that the UE connects to the 5GS over non-3GPP access, the N3IWF is an apparatus deployed and/or a function allocated between non-3GPP access and the 5GCN.

2.4. Apparatus Configuration of SMF

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls the entire operations and functions of the SMF. The controller_B 700 reads and performs various programs stored in the storage unit_B 740 as necessary, and thereby implements various types of processing in the SMF.

The network connection unit_B 720 is a function unit for the SMF to connect to the AMF, and/or the UPF, and/or the PCF, and/or the UDM. In other words, with the use of the network connection unit_B 720, the SMF can transmit and/or receive user data and/or control information to and/or from the AMF, and/or the UPF, and/or the PCF, and/or the UDM.

Detailed description is given with reference to FIG. 2. With the use of the network connection unit_A 620, the SMF in the 5GCN can communicate with the AMF over the N11 interface, can communicate with the UPF over the N4 interface, can communicate with the PCF via the N7 interface, and can communicate with the UDM over the N10 interface.

The storage unit_B 740 is a function unit for storing programs, user data, control information, and the like necessary for each operation of the SMF.

The SMF has a Session Management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of issuing a notification about arrival of downlink data (Downlink Data Notification), a function of providing SM information specific to the AN (for each AN) that is transmitted to the AN through the AMF over the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls the entire operations and functions of the UPF. The controller_B 700 reads and performs various programs stored in the storage unit_B 740 as necessary, and thereby implements various types of processing in the UPF.

The network connection unit_B 720 is a function unit for the UPF to connect to the base station apparatus (gNB), and/or the SMF, and/or the DN in the 5G AN. In other words, with the use of the network connection unit_B 720, the UPF can transmit and/or receive user data and/or control information to and/or from the base station apparatus (gNB), and/or the SMF, and/or the DN in the 5G AN.

Detailed description is given with reference to FIG. 2. With the use of the network connection unit_A 620, the UPF in the 5GCN can communicate with the gNB over the N3 interface, can communicate with the SMF over the N4 interface, can communicate with the DN over the N6 interface, and can communicate with another UPF over the N9 interface.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core network_B), a function of routing and transferring packets, an Uplink Classifier (UL CL) function of supporting routing of multiple traffic flows for one DN, a Branching point function of supporting a multi-homed PDU session, a Quality of Service (QoS) processing function for the user plane, a function of verifying uplink traffic, a function of triggering buffering of downlink packets and Downlink Data Notification, and the like.

The UPF may be a gateway for IP communication and/or non-IP communication. The UPF may have a function of transferring IP communication, or may not have a function of converting non-IP communication and IP communication. In addition, multiple deployed gateways may be gateways for connecting the core network_B and a single DN. Note that the UPF may have connectivity with another NF, and may connect to each apparatus via another NF.

Note that the user plane refers to user data that is transmitted and/or received between the UE and the network. The user plane may be transmitted and/or received using a PDN connection or a PDU session. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, the control plane refers to a control message that is transmitted and/or received in order to perform communication control of the UE or the like. The control plane may be transmitted and/or received using Non-Access-Stratum (NAS) signaling connection between the UE and the MME. In addition, in a case of the EPS, the control plane may be transmitted and/or received using the LTE-Uu interface and the S1-MME interface. In addition, in a case of the 5GS, the control plane may be transmitted and/or received using the interface between the UE and the NG RAN and the N2 interface. The control plane may be hereinafter referred to as a control plane, or may be hereinafter referred to as a C-Plane.

In addition, the User Plane (U-Plane (UP)) may be a communication path for transmitting and/or receiving user data, and may include multiple bearers. In addition, the Control Plane (C-Plane (CP)) may be a communication path for transmitting and/or receiving a control message, and may include multiple bearers.

2.6. Description of Other Apparatuses and/or Functions

Next, other apparatuses and/or functions will be described.

A network refers to at least some of the access network_B, the core network_B, and the DN. One or more apparatuses included in at least a part of the access network_B, the core network_B, and the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

A session management (SM) message (also referred to as a Non-Access-Stratum (NAS) SM message) may be an NAS message used in a procedure for SM or may be a control message transmitted and/or received between the UE_A 10 and the SMF 132 via the AMF 140. In addition, the SM message may include a PDU session establishment request message, a PDU session establishment accept message, a PDU session complete message, a PDU session reject message, a PDU session modification request message, a PDU session modification accept message, a PDU session modification response message, and the like. The procedure for SM may include a PDU session establishment procedure.

A 5G System (5GS) service may be a connection service provided using the core network_B 190. In addition, the 5GS service may be a service different from an EPS service, or may be a service similar to the EPS service.

A non 5GS service may be a service other than the 5GS service and may include an EPS service and/or a non EPS service.

The S1 mode is a mode in which the UE_A 10 is allowed to access the EPC via the E-UTRAN. In other words, the S1 mode may be a mode in which a message is transmitted and/or received using the S1 interface. Note that the S1 interface may include the S1-MME interface and the S1-U interface.

The N1 mode is a mode in which the UE_A 10 is allowed to access the 5GC via the 5G access network. In other words, the N1 mode may be a mode in which a message is transmitted and/or received using the N1 interface.

An Access Point Name (APN) may be identification information for identifying the core network and/or an external network such as the PDN. In addition, the APN can also be used as information for selecting a gateway such as the PGW_A 30/UPF 130 to which the core network A_90 is connected.

In regard to a Traffic Flow Template (TFT), the TFT indicates all the packet filters associated with the EPS bearer. The TFT is information for identifying a part of user data to be transmitted and/or received, and the UE_A 10 transmits and/or receives the user data identified with the TFT by using the EPS bearer associated with the TFT. In addition, in other words, the UE_A 10 transmits and/or receives the user data identified with the TFT by using a Radio Bearer (RB) associated with the TFT. The TFT may associate user data to be transmitted and/or received, such as application data, with an appropriate transfer path, and may be identification information for identifying application data. The UE_A 10 may transmit and/or receive user data that cannot be identified with the TFT by using a default bearer. The UE_A 10 may store the TFT associated with the default bearer in advance.

A Packet Data Network (PDN) type indicates a type of PDN connection and includes IPv4, IPv6, IPv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

The EPS bearer is a logical communication path established between the UE and the PGW and is a communication path constituting PDN connection. The EPS bearer includes a default bearer (also referred to as a default EPS bearer) and a dedicated bearer (also referred to as a dedicated EPS bearer).

The default bearer refers to an EPS bearer that is first established during the PDN connection, and only one default bearer can be established during one PDN connection. The default bearer is an EPS bearer that can be used for communication of user data not associated with the Traffic Flow Template (TFT).

The dedicated bearer refers to an EPS bearer that is established after the default bearer is established during the PDN connection, and one or more dedicated bearers can be established during one PDN connection. The dedicated bearer is an EPS bearer that can be used for communication of user data associated with the TFT.

Although Protocol Data Unit/Packet Data Unit (PDU) session can be defined as a relationship between the DN that provides a PDU connectivity service and the UE, the PDU session may be connectivity established between the UE and an external gateway. In the 5GS, the UE establishes a PDU session via the access network_B and the core network_B, and can thereby perform transmission and/or reception of user data to and/or from the DN by using the PDU session. Here, the external gateway may be a UPF, an SCEF, or the like. The UE can perform transmission and/or reception of user data to and/or from an apparatus deployed in the DN, such as an application server, by using a PDU session.

Note that each apparatus (the UE, and/or the access network apparatus, and/or the core network apparatus) may associate one or more pieces of identification information with PDU session(s) for management. Note that these pieces of identification information may include one or more of a DNN, a TFT, a PDU session type, application identification information, NSI identification information, access network identification information, and an SSC mode, and may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. In addition, the DNN can also be used as information for selecting a gateway such as the PGW_A 30/UPF 130 to which the core network B 190 is connected. In addition, the DNN may correspond to an Access Point Name (APN).

A Protocol Data Unit/Packet Data Unit (PDU) session type indicates a type of PDU session and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using Point-to-Point (P2P) tunneling technique. For the P2P tunneling technique, for example, UDP/IP encapsulation technique may be used. Note that the PDU session type may include the IP, in addition to the above. The IP can be specified in a case that the UE can use both of IPv4 and IPv6.

A network slice (NS) is a logical network that provides specific network capability and network characteristics. The UE and/or the network can support the network slice (NW slice (NS)) in the 5GS.

A network slice instance (NSI) includes a set of an instance (entity) of a network function (NF) and necessary resources and forms a network slice to be allocated. Here, the NF is a processing function in a network, and is adopted or defined in 3GPP. The NSI is an entity of one or more NSs configured in the core network_B. The NSI may include a virtual Network Function (NF) generated using a Network Slice Template (NST). Here, the NST is associated with a resource request for provision of a requested communication service and capability, and is a logical expression of one or more NFs. In other words, the NSI may be a set of multiple NFs in the core network_B 190. The NSI may be a logical network configured for classifying user data to be delivered depending on a service or the like. In the NS, one or more NFs may be configured. The NF configured in the NS may or may not be an apparatus shared with another NS. The UE and/or the apparatus in the network can be allocated to one or more NSs, based on an NSSAI, and/or an S-NSSAI, and/or a UE usage type, and/or registration information such as one or more NSI IDs, and/or an APN. Note that the UE usage type is a parameter value included in registration information of the UE, which is used for identifying the NSI. The UE usage type may be stored in the HSS. The AMF may select the SMF and the UPF, based on the UE usage type.

The Single Network Slice Selection Assistance Information (S-NSSAI) is information for identifying the NS. The S-NSSAI may include only a Slice/Service type (SST), or may include both of an SST and a Slice Differentiator (SD). Here, the SST is information indicating operation of the NS expected in terms of functions and services. The SD may be information for interpolating an SST in a case of selecting one NSI out of multiple NSIs indicated by the SST. The S-NSSAI may be information unique to each PLMN or may be standard information common to the PLMNs. The network may store one or more S-NSSAIs in the registration information of the UE as default S-NSSAI(s). Note that, in a case that the S-NSSAI is a default S-NSSAI, and the UE does not transmit to a network a valid S-NSSAI in a registration request message, the network may provide an NS related to the UE.

The Network Slice Selection Assistance Information (NSSAI) is a set of S-NSSAIs. Each S-NSSAI included in the NSSAI is information for assisting the access network or the core network to select the NSI. The UE may store the NSSAI allowed by the network for each PLMN. The NSSAI may be information used for selecting the AMF.

A tracking area is a single or multiple ranges that can be expressed using the location information of the UE_A 10 managed by the core network. The tracking area may include multiple cells. In addition, the tracking area may be an area in which a control message such as paging is broadcast, or may be an area in which the UE_A 10 can move without performing a handover procedure. In addition, the tracking area may be a routing area, or may be a location area. The tracking area may be any area as long as the area is similar to these. The tracking area may be hereinafter a Tracking Area (TA).

A TA list is a list including one or multiple TAs allocated to the UE_A 10 by the network. Note that, in so far as the UE_A 10 moves within one or multiple TAs included in the TA list, the UE_A 10 may be able to move without performing a registration procedure and/or a tracking area update procedure. In other words, regarding the UE_A 10, the TA list may be an information group indicating an area in which the UE_A 10 can move without performing a registration procedure and/or a tracking area update procedure. Note that the TA list may be referred to as a TAI list including one or multiple Tracking area identities (TAIs), and the TAI list may hereinafter refer to a TA list. The TA list may be referred to as a registration area.

A UE ID is information for identifying the UE. Specifically, the UE ID may be a SUbscription Concealed Identifier (SUCI), or a Subscription Permanent Identifier (SUPI), or a Globally Unique Temporary Identifier (GUTI), or an International Mobile Subscriber Identity (IMEI), or an IMEI Software Version (IMEISV), or a Temporary Mobile Subscriber Identity (TMSI), for example. Alternatively, the UE ID may be other information configured by an application or within the network. Moreover, the UE ID may be information for identifying the user.

A Public land mobile network Identity (PLMN ID) is information for identifying the operator. For example, the PLMN ID may include a Mobile Country Code (MCC) and a Mobile Network Code (MNC). A PLMN with which the UE has been registered may be referred to as a registered PLMN or RPLMN, and the PLMN that is to be handled as a PLMN equivalent to the registered PLMN by the UE at the time of cell selection or handover may be referred to as an equivalent PLMN or EPLMN. Note that a list including one or more EPLMNs may be referred to as an EPLMN list or an equivalent PLMN list. The equivalent PLMN list may be transmitted from the network to the UE during the registration procedure.

A first timer in the present embodiment is a timer that manages an initiation of a procedure for session management such as a PDU session establishment procedure and/or transmission of Session Management (SM) message such as a PDU session establishment request message and may be information indicating a value of a back-off timer for managing behaviors of session management. Hereinafter, the first timer and/or the back-off timer may be referred to as a timer. The initiation of the procedure for session management and/or transmission and reception of the SM message of each apparatus may be inhibited during a time when the first timer is running. Note that the first timer may be configured to be associated with at least one of a congestion control unit applied by the NW and/or a congestion control unit identified by the UE. For example, the first timer may be configured at least one of per APN/DNN, and/or per identification information indicating one or multiple NW slices, and/or per rejection cause value in the session management procedure, and/or per session for which rejection has been indicated in the session management procedure, and/or per PTI in the session management procedure.

Note that the SM message may be an NAS message used in the procedure for session management or may be a control message transmitted and received between the UE_A 10 and the SM 132 via the AMF 140. Furthermore, the SM message may include a PDU session establishment request message, a PDU session establishment accept message, a PDU session complete message, a PDU session reject message, a PDU session modification request message, a PDU session modification accept message, a PDU session modification reject message, and the like. Moreover, the procedure for session management may include a PDU session establishment procedure, a PDU session modification procedure, and the like. In these procedures, a back-off timer value may be included in each message received by the UE_A 10. The UE may configure the first timer to a value of the back-off timer received from the NW, may configure the first timer to a timer value by another method, or may configure the first timer to a random value. In a case that multiple back-off timers received from the NW are included, the UE may manage multiple "first timers" in accordance with the multiple back-off timers or may select one timer value from among the multiple back-off timer values received from the NW based on a policy held by the UE to configure and manage the selected timer value as the first timer. In a case that two back-off timer values are received, for example, the UE configures and manages the back-off timer values received from the NW as a "first timer #1" and a "first timer #2". Alternatively, the UE may select one value from the multiple back-off timer values received from the NW based on a policy held by the UE and configure and manage the selected value as the first timer.

In the case that multiple back-off timer values are received from the NW, the UE_A 10 may manage multiple "first timers" in accordance with the multiple back-off timers. Here, the multiple "first timers" received by the UE_A 10 may be described as, for example, a "first timer #1" or a "first timer #2" in order to distinguish the first timers. Note that the multiple back-off timers may be acquired in one session management procedure or may be acquired in another different session management procedure.

Here, although the first timer may be a back-off timer that is configured for multiple associated NW slices based on information for identifying one NW slice as described above in order to prevent reconnection or a back-off timer that is configured per combination of the APN/DNN and one NW slice in order to prevent reconnection, the first timer is not limited thereto and may be a back-off timer that is configured per combination of the APN/DNN and multiple associated NW slices based on information for identifying one NW slice in order to prevent reconnection.

A second timer in the present embodiment may be a timer used in a first congestion control. Specifically, the second timer may be a back-off timer associated with the DNN. The second timer may be T3396 in 3GPP. The second timer may be the first timer. The UE may enable the first congestion control during a time when the counting of the second timer is performed.

A third timer in the present embodiment may be a timer used in a third congestion control and/or a fourth congestion control. Specifically, the third timer may be a back-off timer associated with the DNN and/or the S-NSSAI. The second timer may be T3584 in 3GPP. The third timer may be the first timer. The UE may enable the third congestion control and/or the third congestion control during a time when the counting of the third timer is performed.

A fourth timer in the present embodiment may be a timer used in a second congestion control. Specifically, the fourth timer may be a back-off timer associated with the S-NSSAI. The second timer may be T3585 in 3GPP. The fourth timer may be the first timer. The UE may enable the second congestion control during a time when the counting of the fourth timer is performed.

The congestion control in the present embodiment may include one or multiple congestion controls among the first to fourth congestion controls. Note that the UE control performed by the NW is implemented by the first timer and a congestion control recognized by the UE and the UE may store the mapping of these pieces of information.

The first congestion control in the present embodiment refers to a control signal congestion control targeted at DNN parameters. For example, in a case that the NW detects congestion on the DNN #A and the NW recognizes that there has been a UE-initiated session management request targeted at parameters of only the DNN #A, the NW may apply the first congestion control. Note that the NW may select a default DNN on a NW initiative basis and consider it to be a congestion control target even in a case that the UE-initiated session management request does not include DNN information. Alternatively, the NW may apply the first congestion control even in a case that the NW recognizes that there has been a UE-initiated session management request including the DNN #A and the S-NSSAI #A. In a case that the first congestion control is applied, the UE may prevent the UE-initiated session management request targeted only at the DNN #A.

In other words, the first congestion control in the present embodiment is a control signal congestion control targeted at the DNN and may be a congestion control that is attributable to the connectivity to the DNN being in a congestion state. For example, the first congestion control may be a congestion control for restricting a connection to the DNN #A in all connectivities. Here, the connection to the DNN #A in all connectivities may be a connection to the DNN #A in a connectivity using all S-NSSAIs available for the UE and may be a connection to the DNN #A via a network slice to which the UE can be connected. Moreover, a connectivity to the DNN #A without any network slice may be included. In the present embodiment, the first congestion control may be referred to as a DNN-based congestion control.

The second congestion control in the present embodiment refers to a control signal congestion control targeted at parameters of the S-NSSI. For example, in a case that the NW detects control signal congestion on the S-NSSAI #A and the NW recognizes that there has been a UE-initiated session management request targeted only at the parameters of the S-NSSAI #A, the NW may apply the second congestion control. In a case that the second congestion control is applied, the UE may prevent a UE-initiated session management request targeted only at the S-NSSAI #A.

In other words, the second congestion control in the present embodiment is a control signal congestion control targeted at the S-NSSAI and may be a congestion control that is attributable to a network slice, selected by the S-NSSAI, that is in the congestion state. For example, the second congestion control may be a congestion control for restricting all connections based on the S-NSSAI #A. In other words, the second congestion control may be a congestion control for restricting connection to all the DNNs via the network slice selected by the S-NSSAI #A. In the present embodiment, the second congestion control may be referred to as an S-NSSAI-based congestion control.

The third congestion control in the present embodiment refers to a control signal congestion control targeted at parameters of the DNN and the S-NSSAI. In a case that the NW detects control signal congestion on the DNN #A and control signal congestion on the S-NSSAI #A at the same time, and the NW recognizes a UE-initiated session management request targeted at the parameters of the DNN #A and the S-NSSAI #A, the NW may apply the third congestion control. Note that the NW may select a default DNN on an NW initiative basis and consider it to be a congestion control target together even in a case that the UE-initiated session management request does not include information indicating the DNN. In a case that the third congestion control is applied, the UE may prevent the UE-initiated session management request targeted at the parameters of the DNN #A and the S-NSSAI #A.

In other words, the third congestion control in the present embodiment is a control signal congestion control targeted at parameters of the DNN and the S-NSSAI and may be a congestion control that is attributable to the connectivity to the DNN via the network slice selected based on the S-NSSAI being in the congestion state. For example, the third congestion control may be a congestion control for restricting connection to the DNN #A in the connectivities based on the S-NSSAI #A. In the present embodiment, the third congestion control may be a congestion control based on a combination of the S-NSSAI and the DNN or congestion control for the combination of the S-NSSASI and the DNN.

The fourth congestion control in the present embodiment refers to a control signal congestion control targeted at least at one parameter of the DNN and/or the S-NSSAI. In a case that the NW detects control signal congestion on the DNN #A and control signal congestion on the S-NSSAI #A at the same time and the NW recognizes that there has been a UE-initiated session management request targeted on at least at one parameter of the DNN #A and/or the S-NSSAI #A, for example, the NW may apply the fourth congestion control. Note that the NW may select the default DNN on an NW initiative basis and consider it to be a congestion control target together even in a case that the UE-initiated session management request does not include information indicating the DNN. In a case that the fourth congestion control is applied, the UE may prevent a UE-initiated session management request targeted at least at one parameter of the DNN #A and/or the S-NSSAI #A. In the present embodiment, the fourth congestion control may be referred to as a congestion control based on a combination of the S-NSSAI and the DNN or a congestion control for the combination of the S-NSSAI and the DNN.

In other words, the fourth congestion control in the present embodiment is a control signal congestion control targeted on parameters of the DNN and the S-NSSAI and may be a congestion control that is attributable to a network slice selected based on the S-NSSAI and connectivity to the DNN being in the congestion state. For example, the fourth congestion control may be a congestion control for restricting all connections based on the S-NSSAI #A and may be a congestion control for restricting connection to the DNN #A in all connectivities. In other words, the fourth congestion control is a congestion control for restricting connection to all the DNNs via the network slice selected by the S-NSSAI #A and may be a congestion control for restricting connection to the DNN #A in all connectivities. Here, the connection to the DNN #A in all connectivities may be a connection to the DNN #A in a connectivity using all possible S-NSSAI for the UE and may be a connection to the DNN #A via a network slice to which the UE can be connected. Moreover, a connectivity to the DNN #A without any network slice may be included.

Thus, the fourth congestion control using the DNN #A and the S-NSSAI #A as parameters may be a congestion control that performs the first congestion control using the DNN #A as a parameter and the second congestion control using the S-NSSAI #A as a parameter at the same time.

Also, a Non-Public Network (NPN) is a non-public network used by specific users for specific purposes, such as by companies or for private utilization, instead of a purpose of general utilization. As NPNs, two types of NPNs, namely a Standard-alone Non-Public Network (SNPN) and a Public network integrated NPN are present. Note that in a case that description NPN is provided below, it may mean both the SNPN and the Public network integrated NPN.

The SNPN is operated by an NPN operator and is not affected by function units provided by the PLMN. In other words, the SNPN is an NPN-dedicated network that is independent from the PLMN opened to public. The SNPN may be identified by a combination of a PLMN ID and an NID, and the combination of the PLMN ID and the NID may be used as an SNPN identity (SNPN ID). The PLMN ID used for the SNPN may be information secured for a private network, and MCC included in the PLMN ID may be 999, for example. Note that in a case that the UE is registered for the SNPN, the registered SNPN may be referred to as a registered SNPN or RNPN.

The Network identifier (NID) is information for identifying the network. The SNPN may be identified by a combination of a PLMN ID and an NID. The NID may be information that is unique in the SNPN or may be information that is unique worldwide.

Also, the Public network integrated NPN is implemented using function units of the PLMN. In other words, the Public network integrated NPN is an NPN that is virtually implemented in the PLMN. Moreover, the Public network integrated NPN is an NPN that can be created via the PLMN. The Public network integrated NPN may be implemented using a function of the network slice, for example. Specifically, the Public network integrated NPN can be implemented using the network slice allocated for the NPN. The Public network integrated NPN may be identified by the S-NSSAI or may be identified by a combination of the S-NSSAI and a CAG ID. Alternatively, the Public network integrated NPN may be implemented using the DN, for example. Specifically, the Public network integrated NPN is implemented using the DN for the NPN.

Also, the Closed Access Groups (CAG) ID is information for identifying a group of subscribers who are allowed to connect to one or multiple cells associated with the CAG, and the CAG is a group identified by the CAG ID. The CAG is a group used in a case that the Public network integrated NPN is implemented by the network slice. The CAG is used in order for the UE not to attempt access to the network slice allocated for the NPN, the UE being not allowed to use the NPN. The CAG ID is information that is unique in the PLMN.

An SNPN enable UE is a UE configured to use the SNPN. In other words, UE configuration information of the SNPN enable UE may include information indicating that the SNPN can be used, or the UE may store information regarding at least one SNPN. The SNPN enable UE may support an SNPN access mode. In other words, the SNPN enable UE may or may not operate in the SNPN access mode.

The UE that is operating in the SNPN access mode is a UE that selects only the SNPN at the time of selecting a network. The UE that is operating in the SNPN access mode may be referred to as a UE in the SNPN access mode. The UE in the SNPN access mode is an SNPN enable UE.

Next, the identification information in the present embodiment will be described.

First identification information is a cause value. In a case that the first identification information is included in a PDU session reject message, the first identification information may be information indicating a cause for the rejection of the request from the UE by the network or a cause for being unable to establish a PDU session by the network. The first identification information may be second to fourth identification information.

The second identification information is information indicating that a PDU session cannot be established due to insufficient resources of the network. The second identification information may be information indicating that a DNN-based congestion control has been detected and/or that a DNN-based congestion control is being performed. Moreover, the second identification information may be information for requesting a start of the DNN-based congestion control and/or processing based on detection of the DNN-based congestion control. The second identification information may be a 5G session management cause value #26 (5GSM cause #26 "Insufficient resources"). The second identification information may be the first identification information.

The third identification information is information indicating that a PDU session cannot be established because the network has insufficient resources for a specific network slice and DN. The third identification information may be information indicating that a congestion control based on a combination of the S-NSSAI and the DNN has been detected and the congestion control based on the combination of the S-NSSAI and the DNN is being performed. Moreover, the third identification information may be information for requesting a start of a congestion control based on the combination of the S-NSSAI and the DNN and/or processing based on detection of the congestion control based on the combination of the S-NSSAI and the DNN. The third identification information may be a 5G session management cause value #67 (5GSM cause #67 "Insufficient resource for specific slice and DNN"). The third identification information may be the first identification information.

The fourth identification information is information indicating that a PDU session cannot be established because the network has insufficient resources for the network slice requested by the UE. The fourth identification information may be information indicating that an S-NSSAI-based congestion control has been detected and/or that the S-NSSAI-based congestion control is being performed. Moreover, the fourth identification information may be information for requesting a start of an S-NSSAI-based congestion control and/or processing based on detection of the S-NSSAI-based congestion control. The fourth identification information may be a 5GS session management cause #69 (5GSM cause #69 "Insufficient resources for specific slice"). The fourth identification information may be the first identification information.

The fifth identification information may be a value of a back-off timer. The fifth identification information may be information that requests for and indicates a minimum period (interval) until execution of the session management procedure is retried. In a case that the UE is registered with the NPN, the fifth identification information may be a valid value for a PLMN used for the registered NPN, or the registered NPN, and an equivalent PLMN. The fifth identification information may be associated with at least one of the first to fourth pieces of identification information.

The eleventh identification information is a cause value. In a case that the eleventh identification information is included in the PDU session reject message, the eleventh identification information may be information indicating a cause for rejection of the request from the UE by the network or a cause for initiation of the network-initiated PDU session management procedure by the network. The eleventh identification information may be twelfth to fourteenth identification information. The eleventh identification information may be the same as the first identification information.

The twelfth identification information is information indicating that the network-initiated PDU session management procedure is to be started due to insufficient resources of the network. The twelfth identification information may be information indicating that a DNN-based congestion control has been detected and/or that the DNN-based congestion control is being performed. Moreover, the twelfth identification information may be information for requesting a start of a DNN-based congestion control and/or processing based on detection of the DNN-based congestion control. The twelfth identification information may be a 5G session management cause value #26 (5GSM cause #26 "Insufficient resources"). The twelfth identification information may be the eleventh identification information. The twelfth identification information may be the same as the second identification information.

The thirteenth identification information is information indicating that a network-initiated PDU session management procedure is to be started because the network has insufficient resources for a specific network slice and DN. The thirteenth identification information may be information indicating that a congestion control based on a combination of the S-NSSAI and the DNN has been detected and that the congestion control based on the combination of the S-NSSAI and the DNN is being performed. Furthermore, the thirteenth identification information may be information for requesting the congestion control based on the combination of the S-NSSAI and the DNN and/or processing based on detection of the congestion control based on detection of the combination of the S-NSSAI and the DNN. The thirteenth identification information may be a 5G session management cause value #67 (5GSM cause #67 "Insufficient resources for specific slice and DNN"). The thirteenth identification information may be the eleventh identification information. The thirteenth identification information may be the same as the third identification information.

The fourteenth identification information may be information indicating that a network-initiated PDU session management procedure is to be started because the network has insufficient resources for the network slice requested by the UE. The fourteenth identification information may be information indicating that an S-NSSAI-based congestion control has been detected and/or an S-NSSAI-based congestion control is being performed. Moreover, the fourteenth identification information may be information for requesting a start of an S-NSSAI-based congestion control and/or processing based on detection of the S-NSSAI-based congestion control. The fourteenth identification information may be a 5GS session management cause #69 (5GSM cause #69 "Insufficient resources for specific slice"). The fourteenth identification information may be the eleventh identification information. The fourteenth identification information may be the same as the fourth identification information.

The fifteenth identification information may be a value of a back-off timer. The fifth identification information may be information that requests for and indicates a minimum period (interval) until execution of the session management procedure is retried. In a case that the UE is registered with the NPN, the fifteenth identification information may be a valid value for a PLMN used for the registered NPN, or the registered NPN, and an equivalent PLMN. The fifteenth identification information may be associated with at least one of the eleventh to fourteenth pieces of identification information. The fifteenth identification information may be the same as the fifth identification information.

The twenty first identification information is a cause value. In a case that the twenty first identification information is included in the PDU session modification reject message, the twenty first identification information may be information indicating a cause for rejection of a request from the UE by the network or a cause for being unable to modify the PDU session by the network. The twenty first identification information may be the twenty second to twenty fourth identification information.

The twenty second identification information is information indicating that a PDU session cannot be established and/or that the PDU session cannot be modified due to insufficient resources of the network. The twenty second identification information may be information indicating that a DNN-based congestion control has been detected and/or the DNN-based congestion control is being performed. Moreover, the twenty second identification information may be information for requesting a start of a DNN-based congestion control and/or processing based on detection of the DNN-based congestion control. The twenty second identification information may be a 5G session management cause value #26 (5GSM cause #26 "Insufficient resources"). The second identification information may be the twenty first identification information. The twenty second identification information may be the same as the second identification information.

The twenty third identification information is information indicating that a PDU session cannot be established and/or that the PDU session cannot be modified because the network has insufficient resources for a specific network slice and DN. The twenty third identification information may be information indicating that a congestion control based on a combination of the S-NSSAI and the DNN has been detected and that the congestion control based on the combination of the S-NSSAI and the DNN is being performed. Moreover, the twenty third identification information may be information for requesting a start of the congestion control based on the S-NSSAI and the DNN and processing based on detection of the congestion control based on the combination of the S-NSSAI and the DNN. The twenty third identification information may be a 5G session management cause value #67 (5GSM cause #67 "Insufficient resources for specific slice and DNN"). The twenty third identification information may be the twenty first identification information. The twenty third identification information may be the same as the third identification information.

The twenty fourth identification information is information indicating that a PDU session cannot be established and/or that the PDU session cannot be modified because the network has insufficient resources for the network slice requested by the UE. The twenty fourth identification information may be information indicating that an S-NSSAI-based congestion control has been detected and/or the S-NSSAI-based congestion control is being performed. Moreover, the twenty fourth identification information may be information for requesting a start of an S-NSSAI-based congestion control and/or processing based on detection of the S-NSSAI-based congestion control. The twenty fourth identification information may be a 5GS session management cause #69 (5GSM cause #69 "Insufficient resources for specific slice"). The twenty fourth identification information may be the twenty first identification information. The twenty fourth identification information may be the same as the fourth identification information.

The twenty fifth identification information may be a value of a back-off timer. The twenty fifth identification information may be information that requests for and indicates a minimum period (interval) until execution of the session management procedure is retried. In a case that the UE is registered with the NPN, the twenty fifth identification information may be a valid value for a PLMN used for the registered NPN, or the registered NPN, and the equivalent PLMN. The twenty fifth identification information may be associated with at least one of the twenty first to twenty fourth pieces of identification information.

3. Description of Procedures Used in Each Embodiment

First, procedure used in each embodiment will be described. Note that the procedures used in each embodiment include a registration procedure, a network slice-specific authentication and authorization procedure, and a generic UE configuration update procedure. Each procedure will be described below.

Note that, in each embodiment, a case that each of the combinations including the HSS and the UDM, the PCF and the PCRF, the SMF and the PGW-C, and the UPF and the PGW-U is configured to form a single apparatus (that is, the same physical hardware, or the same logical hardware, or the same software) as illustrated in FIG. 2 will be described as an example. However, the details described in the present embodiment can also be applied to a case that each of the combinations is configured to form different apparatuses (that is, different pieces of physical hardware, or different pieces of logical hardware, or different pieces of software). For example, data may be directly transmitted and/or received between these apparatuses, data may be transmitted and/or received over the N26 interface between the AMF and the MME, or data may be transmitted and/or received via the UE.

3.1. Registration Procedure

Figure 6:
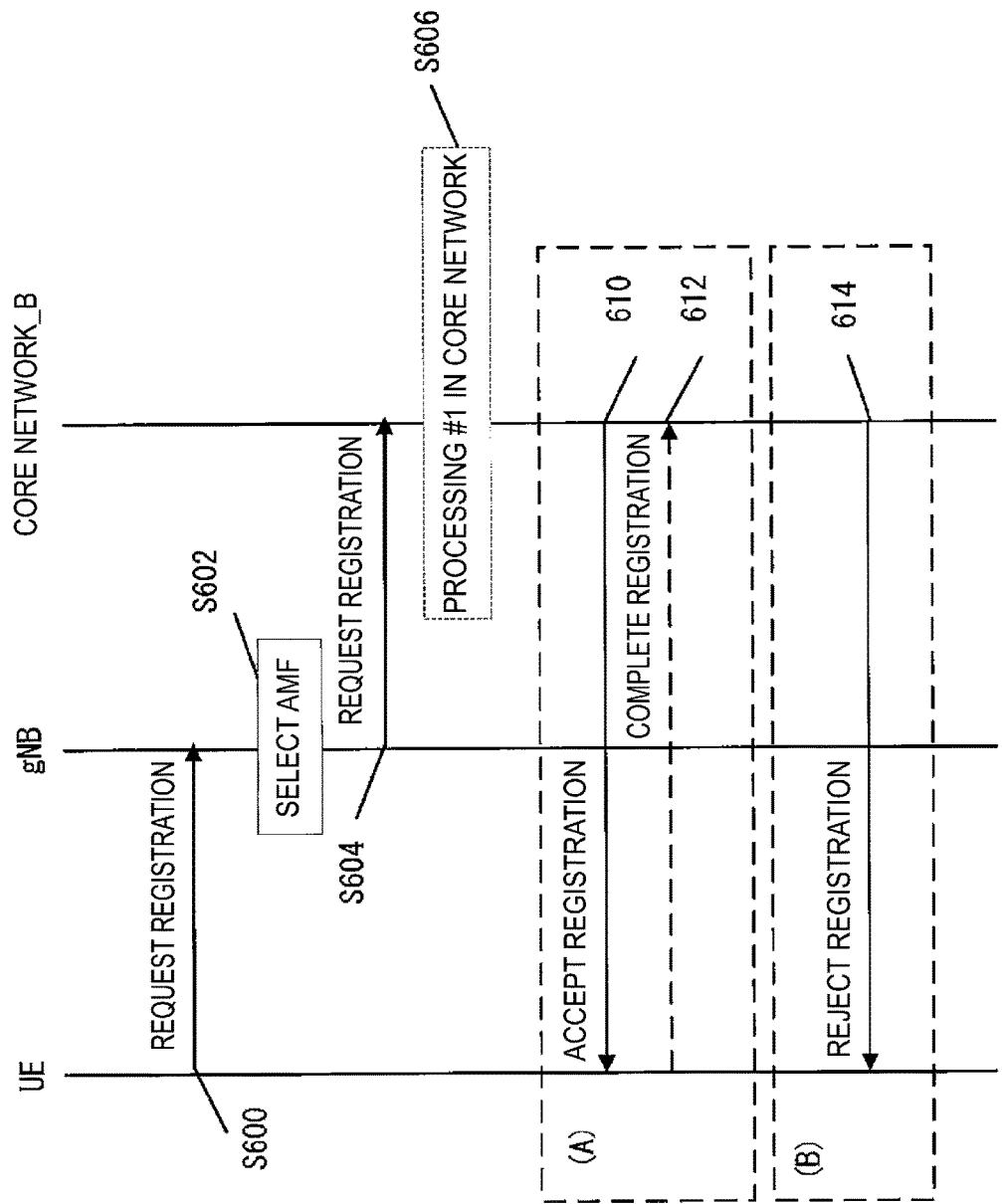
FIG. 6 is a diagram illustrating a registration procedure.

First, the Registration procedure will be described with reference to FIG. 6. Hereinafter, the present procedure will refer to the registration procedure. The registration procedure is a procedure for registration with the access network_B, and/or the core network_B, and/or the DN as initiated by the UE. In a case that the UE is in a state of not being registered with the network, for example, the UE can perform the present procedure at any timing such as the timing at which the UE is turned on. In other words, the UE can initiate the present procedure at any timing in a case that the UE is in the deregistered state (RM-DEREGISTERED state). Each apparatus (in particular, the UE and the AMF) can transition to the registered state (RM-REGISTERED state), based on completion of the registration procedure.

Note that the present procedure may be a registration procedure for the NPN and each apparatus can transition to a registration state (a registered state or a non-registered state) per NPN based on completion of the present procedure.

In addition, the registration procedure may be a procedure for updating position registration information of the UE in the network, and/or periodically giving a notification of the state of the UE from the UE to the network, and/or updating a specific parameter related to the UE in the network.

In a case that the UE performs mobility for crossing a TA, the UE may initiate the registration procedure. In other words, the UE may initiate the registration procedure in a case that the UE moves to a TA that is different from the TA indicated in the TA list held (or the registration area). In addition, the UE may initiate the present procedure in a case that a running timer expires. In addition, the UE may initiate the registration procedure in a case that a context of each apparatus needs to be updated due to disconnection and deactivation of a PDU session. In addition, in a case that there is a change in capability information and/or a preference, related to PDU session establishment, of the UE, the UE may initiate the registration procedure. In addition, the UE may periodically initiate the registration procedure. Moreover, the UE may initiate the registration procedure based on completion of the UE configuration update procedure, or based on completion of the registration procedure, or based on completion of the PDU session establishment procedure, or based on completion of the PDU session management procedure, or based on information received from the network in each procedure. Note that these are not restrictive, and the UE can perform the registration procedure at any timing.

Note that the above described procedure for the UE to transition from a state of not being registered with the network to a state of being registered with the network may be considered to be an initial registration procedure, or a registration procedure performed in a state in which the UE is registered with the network may be considered to be a registration procedure for mobility and periodic registration update.

First, the UE initiates the registration procedure by transmitting a registration request message to the AMF in the core network_B in the steps (S600), (S602), and (S604). Specifically, the UE transmits an RRC message including the registration request message to the 5G AN (or the gNB) (S600). Moreover, the registration request message is an NAS message transmitted and received over the N1 interface. The RRC message may be a control message transmitted and/or received between the UE and the 5G AN (or the gNB). The NAS message is processed in the NAS layer, and the RRC message is processed in the RRC layer. Note that the NAS layer is a layer higher than the RRC layer.

Here, the UE can include and transmit information indicating a request for connection to the NPN in the registration request message and/or the RRC message. Note that the information indicating the request for connection to the NPN may be the SNPN ID, may be the S-NSSAI for the NPN, may be the DNN for the NPN, may be the CAG ID, or may be a combination thereof.

Note that the UE may select or determine whether or not to transmit to the network the information indicating a request for connection to the NPN based on UE capability information, and/or a UE policy, and/or a UE state, and/or user registration information, and/or a context held by the UE.

Specifically, in a case that the UE supports a function of connection to the NPN, in a case that the UE requests for connection to the NPN, and/or in a case that the UE is an SNPN enable UE, and/or in a case that the UE is in an SNPN access mode, the information indicating a request for connection to the NPN may be transmitted to the network.

The UE may include information other than the information indicating the request for connection to the NPN in the registration request message and/or the RRC message including the registration request message and may include and transmit the UE ID, for example. Note that the UE transmits to the network the information indicating the request for connection to the NPN, the UE ID may be a UE ID for the NPN.

By including and transmitting an SM message (for example, the PDU session establishment request message) in the registration request message, or by transmitting an SM message (for example, the PDU session establishment request message) together with the registration request message, the UE may initiate the PDU session establishment procedure during the registration procedure.

In a case that the 5G AN (or the gNB) receives the RRC message including the registration request message, then the 5G AN (or the gNB) selects the AMF to transfer the registration request message (S602). Note that the 5G AN (or the gNB) can select the AMF based on the registration request message and one or more pieces of identification information included in the RRC message including the registration request message. Specifically, the 5G AN (or the gNB) may select the AMF that is a transmission destination of the registration request message based on at least one piece of identification information in the information indicating the request for connection to the NPN.

For example, the 5G AN (or the gNB) may select the AMF based on the PLMN ID included in the SNPN ID, may select the AMF based on the SNPN ID, may select the AMF based on the S-NSSAI, or may select the AMF based on the DNN.

Note that the method of selecting the AMF is not limited thereto and the 5G AN (or the gNB) may select the AMF based on other conditions. The 5G AN (or the gNB) extracts the registration request message from the received RRC message and transfers the registration request message to the selected AMF (S604). Note that in a case that the information indicating the request for connection to the NPN is not included in the registration request message and is included in the RRC message, the identification information included in the RRC message may be transferred to the selected AMF together with the registration request message (S604).

In a case that the AMF receives the registration request message, the AMF performs processing #1 (S606) in the core network. The processing #1 in the core network may be execution of first condition fulfillment determination, generation of a UE context, an authentication procedure, or a combination thereof, for example.

The 1st condition fulfillment determination is a condition fulfillment determination for determining whether or not the network (or the AMF) accepts the request from the UE. In a case that the first condition fulfillment determination is true, each apparatus performs a procedure (A). On the other hand, in a case that the first condition fulfillment determination is false, each apparatus may skip the procedure (A) and perform a procedure (B).

Note that the first condition fulfillment determination may be performed based on reception of the registration request message, and/or each piece of identification information included in the registration request message, and/or subscriber information, and/or capability information of the network, and/or an operator policy, and/or a network state, and/or registration information of a user, and/or a context stored in the AMF, and/or the like.

For example, the first condition fulfillment determination may be true in a case that the network allows the request from the UE, and the first condition fulfillment determination may be false in a case that the network does not allow the request from the UE. In a case that a network with which the UE is to be registered and/or an apparatus in the network supports the function requested by the UE, the 1st condition fulfillment determination may be true, whereas in a case that the network and/or the apparatus does not support the function requested by the UE, the 1st condition fulfillment determination may be false. In addition, in a case that the transmitted and/or received identification information is allowed, the 1st condition fulfillment determination may be true, whereas in a case that the transmitted and/or received identification information is not allowed, the 1st condition fulfillment determination may be false.

First, the procedure (A) in the present procedure will be described. In a case that the AMF determines that the registration request from the UE is to be accepted, the AMF transmits a registration accept message to the UE based on the determination (S610).

The AMF may include the information indicating that the connection to the NPN has been allowed in the registration accept message and/or the RRC message including the registration accept message and transmit the resultant information to the UE. Note that the information indicating that the connection to the NPN has been allowed may be the SNPN ID, may be the S-NSSAI for the NPN, may be the DNN for the NPN, may be the CAG ID, or may be a combination thereof.

Note that the AMF may select and determine the identification information to be included in the registration accept message based on the received identification information, and/or the subscriber information, and/or the network capability information, and/or the operator policy, and/or the network state, and/or the user registration information, and/or the context held by the AMF, and/or the like.

The AMF can either include and transmit an SM message (for example, the PDU session establishment accept message) in the registration accept message, or transmit an SM message (for example, the PDU session establishment accept message) together with the registration accept message. However, such a transmission method may be performed in a case that the SM message (for example, the PDU session establishment request message) is included in the registration request message. Also, such a transmission method may be performed in a case that the SM message (for example, the PDU session establishment request message) is included along with the registration request message. By performing such a transmission method as described above, the AMF can indicate that a procedure for SM is accepted in the registration procedure.

By transmitting the registration accept message based on each piece of received identification information, and/or subscriber information, and/or capability information of the network, and/or an operator policy, and/or a state of the network, and/or registration information of a user, and/or a context stored in the AMF, and/or the like, the AMF may indicate that the request from the UE is accepted.

The UE receives the registration accept message via the 5G AN (gNB) (S610). By receiving the registration accept message, the UE can recognize that the request from the UE on the registration request message is accepted, and recognize details of various pieces of identification information included in the registration accept message.

The UE can further transmit to the AMF a registration complete message as a response message to the registration accept message via the 5G AN (gNB) (S612). Note that, in a case that the UE receives the SM message such as the PDU session establishment accept message, the UE may include and transmit the SM message such as the PDU session establishment complete message in the registration complete message, or may indicate that the procedure for SM has completed by including the SM message. Here, the registration complete message is a NAS message transmitted and/or received over the N1 interface; however, between the UE and the 5G AN (gNB), the registration complete message is transmitted and/or received on an RRC message.

The AMF receives the registration complete message via the 5G AN (gNB) (S612). In addition, each apparatus completes the procedure (A) in the present procedure and the registration procedure based on the transmission and reception of the registration accept message and/or the registration complete message.

Next, a case that the 1st condition fulfillment determination is false will be described. The AMF transmits a registration reject message as a response message to the registration request message to the UE via the 5G AN (gNB) (S614). Here, the registration reject message is a NAS message transmitted and received over the N1 interface; however the registration reject message is included and transmitted and/or received in the RRC message between the UE and the 5G AN (gNB).

Note that the AMF may indicate that the request from the UE using the registration request message has been rejected by transmitting the registration reject message.

Note that each type of processing performed by the UE based on reception of each piece of identification information described above may be performed during the present procedure or after completion of the present procedure or may be performed based on completion of the present procedure after completion of the present procedure. The UE receives the registration reject message via the 5G AN (gNB). The UE can recognize that the request from the UE using the registration request message has been rejected and the content of various kinds of identification information included in the registration reject message by receiving the registration reject message. In a case that the UE does not receive the registration accept message or the registration reject message even after a prescribed time period has elapsed after transmitting the registration request message, the UE may recognize that the request from the UE is rejected. Each apparatus may complete the registration procedure based on the transmission and the reception of the registration reject message.

Note that each apparatus may transition to or maintain a state in which the UE is registered with the network (an RM_REGISTERED state or a 5GMM-REGISTERED state) based on the transmission and/or reception of the registration accept message and/or the registration complete message or may transition to or maintain a state in which the UE has not registered the network (an RM_DEREGISTERED state or a 5GMM-DEREGISTERED state) based on the transmission and/or reception of the registration reject message. Also, the transition of each apparatus to each state may be performed based on completion of the registration procedure.

In addition, each apparatus may perform processing based on information transmitted and received in the registration procedure based on completion of the registration procedure. For example, in a case that information indicating that a part of the request from the UE is rejected is transmitted and/or received, a reason of rejection of the request from the UE may be recognized. In addition, each apparatus may perform the present procedure again or may perform the registration procedure on the core network_A or another cell based on the cause for the rejection of the request from the UE.

Moreover, the UE may store the identification information received along with the registration accept message and/or the registration reject message or may recognize determination of the network, based on the completion of the registration procedure.

Moreover, each apparatus may initiate the PDU session establishment procedure on the NPN based on the completion of the registration procedure. Note that details of the PDU session establishment procedure will be described later.

3.2. PDU Session Establishment Procedure

Next, an overview of the PDU session establishment procedure performed to establish a PDU session will be described. The PDU session establishment procedure will also be referred to as a present procedure below. The present procedure is a procedure for each apparatus to establish the PDU session. Note that each apparatus may perform the present procedure in a state in which the registration procedure is completed or during the registration procedure. In addition, each apparatus may initiate the present procedure in a registered state, or may initiate the present procedure at any timing after the registration procedure. Moreover, the UE may initiate the present procedure in a case that counting of at least one timer among the first to fourth timers that are being performed is completed. Each apparatus may establish a PDU session based on completion of the PDU session establishment procedure. Furthermore, each apparatus may perform the present procedure multiple times to establish multiple PDU sessions.

Note that the present procedure may be a PDU session establishment procedure with respect to the NPN, and each apparatus may establish a PDU session with respect to the NPN based on completion of the present procedure.

Figure 7:
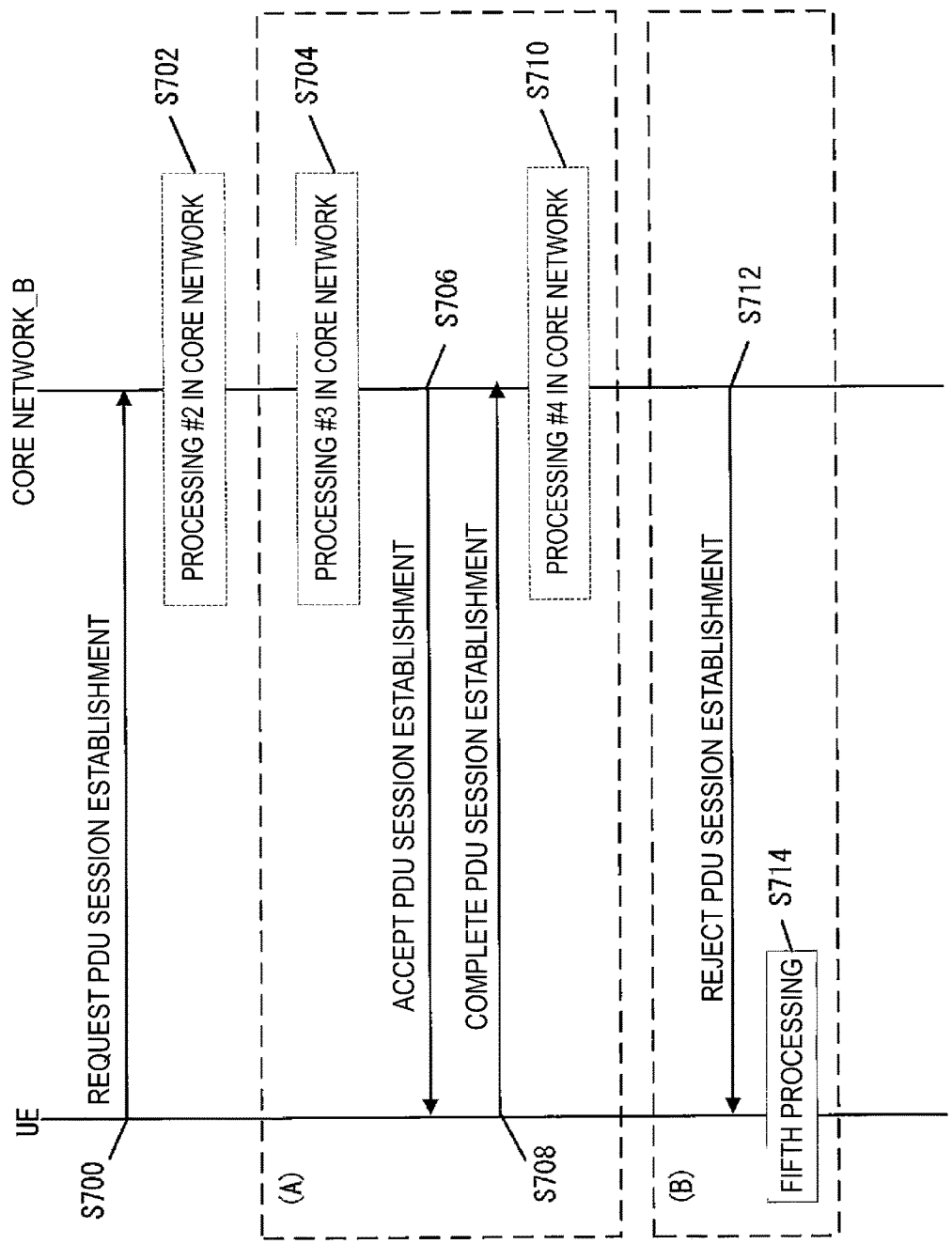
FIG. 7 is a diagram illustrating a PDU session establishment procedure.

An example of a procedure for executing the PDU session establishment procedure will be described with reference to FIG. 7. Each step of the present procedure will be described below. First, the UE_A 10 initiates the PDU session establishment procedure by transmitting a PDU session establishment request message to the core network_B over the access network_B (S700).

Specifically, the UE_A 10 transmits the PDU session establishment request message to the AMF 140 in the core network_B 190 via the NR node_A 122 using the N1 interface (S700).

Here, the UE_A 10 may include the information indicating the NPN in the PDU session establishment request message or may indicate that the UE_A 10 requests for connection to the NPN by including the information indicating the NPN. Note that the information indicating the NPN may be the SNPN ID, may be the S-NSSAI for the NPN, may be the DNN for the NPN, may be the CAG ID, or a combination thereof. Note that the two or more pieces of identification information among the identification information may be configured as one or more pieces of identification information, or one piece of identification information may be configured by two or more pieces of identification information.

The AMF receives the PDU session establishment request message and performs the third condition fulfillment determination. The third condition fulfillment determination is for the AMF to determine whether or not to accept the request from the UE_A 10. The core network_B starts processing #2 in the core network in a case that the third condition fulfillment determination is true (S702) or initiates the procedure (B) in the present procedure in a case that the third condition fulfillment determination is false. Note that steps performed in a case that the third condition fulfillment determination is false will be described later. Here, the processing #2 in the core network may be selection of the SMF performed by the AMF in the core network_B 190, and/or the transmission and/or reception and transfer procedure of the PDU session establishment request message of the AMF and the SMF.

The core network_B 190 starts the processing #2 in the core network. In the processing #2 in the core network, the AMF 140 may select the SMF 132 as an NF that is a routing destination of the PDU session establishment request message and transmit or transfer the PDU session establishment request message to the selected SMF 132 using the N11 interface. Here, the AMF 140 may select the SMF 132 that is a routing destination based on information included in the PDU session establishment request message. More specifically, the AMF 140 may select the SMF 132 that is a routing destination based on the identification information acquired based on the reception of the PDU session establishment request message, and/or the subscriber information, and/or the network capability information, and/or the operator policy, and/or the network state, and/or the context that has already been held by the AMF 140.

The PDU session establishment request message may be a NAS message. The PDU session establishment request message only needs to be a message requesting the PDU session establishment and not limited to this.

The SMF 132 in the core network_B 190 receives the PDU session establishment request message and performs the third condition fulfillment determination. The third condition fulfillment determination is performed in order for the SMF 132 to determine whether or not to accept the request from the UE_A 10. In the third condition fulfillment determination, the SMF 132 determines whether the third condition fulfillment determination is true or false. The SMF 132 initiates the procedure (A) in the present procedure in a case that the third condition fulfillment determination is true or initiates the procedure (B) in the present procedure in a case that the third condition fulfillment determination is false. Note that steps performed in a case that the third condition fulfillment determination is false will be described later.

Hereinafter, steps in a case that the third condition fulfillment determination is true, that is, each step in the procedure (A) in the present procedure will be described. The SMF 132 selects the UPF 130 that is a destination of establishment of the PDU session and performs eleventh condition fulfillment determination.

Here, the eleventh condition fulfillment determination is performed in order for each apparatus to determine whether or not to perform processing #3 in the core network. Here, the processing #3 in the core network may include an initiation and/or execution of the PDU session establishment authentication procedure performed by each apparatus, and/or transmission and reception of a session establishment request message between the SMF and the UPF in the core network_B 190, and/or transmission and reception of a session establishment response message, and/or the like (S704). In the eleventh condition fulfillment determination, the SMF 132 determines whether the eleventh condition fulfillment determination is true or false. The SMF 132 initiates the PDU session establishment authentication approval procedure in a case that the eleventh condition fulfillment determination is true or omits the PDU session establishment authentication approval procedure in a case that the eleventh condition fulfillment determination is false. Note that details of the PDU session establishment authentication approval procedure in the processing #2 in the core network will be described later.

Next, the SMF 132 transmits a session establishment request message to the selected UPF 130 and initiates the procedure (A) in the present procedure based on completion of the eleventh condition fulfillment determination and/or the PDU session establishment authentication approval procedure. Note that the SMF 132 may initiate the procedure (B) in the present procedure without initiating the procedure (A) in the present procedure based on completion of the PDU session establishment authentication approval procedure.

Here, the SMF 132 may select one or more UPFs 130 based on the identification information acquired based on reception of the PDU session establishment request message, and/or the network capability information, and/or the subscriber information, and/or the operator policy, and/or the network state, and/or the context that has already been held by the SMF 132. Note that in a case that multiple UPFs 130 are selected, the SMF 132 may transmit the session establishment request message to each of the UPFs 130.

The UPF 130 receives a session establishment request message and creates a context for the PDU session. Moreover, the UPF 130 may transmit a session establishment response message to the SMF 132 based on reception of the session establishment request message and/or creation of the context for the PDU session. Moreover, the SMF 132 receives the session establishment response message. Note that the session establishment request message and the session establishment response message may be control messages transmitted and received over the N4 interface. Further, the session establishment response message may be a response message to the session establishment request message.

Moreover, the SMF 132 may perform address allocation of an address to be allocated to the UE_A 10 based on reception of the PDU session establishment request message, and/or selection of the UPF 130, and/or reception of the session establishment response message. Note that the SMF 132 may perform the address allocation of the address to be allocated to the UE_A 10 during the PDU session establishment procedure or after completion of the PDU session establishment procedure.

Specifically, in a case that the SMF 132 allocates the IPv4 address without using the DHCPv4, the address allocation may be performed during the PDU session establishment procedure, or the allocated address may be transmitted to the UE_A 10. Moreover, in a case that the SMF 132 allocates the IPv4 address and/or the IPv6 address, and/or the IPv6 prefix using the DHCPv4 or the DHCPv6 or the SLAAC (Stateless Address Autoconfiguration), the SMF 132 may perform the address allocation after the PDU session establishment procedure or transmit the allocated address to the UE_A 10. Note that the address allocation performed by the SMF 132 is not limited thereto.

Moreover, the SMF 132 may include the allocated address in the PDU session establishment accept message and transmit the address to the UE_A 10 based on completion of the address allocation of the address to be allocated to the UE_A 10 or may transmit the allocated address to the UE_A 10 after completion of the PDU session establishment procedure.

The SMF 132 transmits a PDU session establishment accept message to the UE_A 10 via the AMF 140 based on reception of the PDU session establishment request message, and/or selection of the UPF 130, and/or reception of the session establishment response message, and/or completion of the address allocation of the address to be allocated to the UE_A 10 (S706).

Specifically, the SMF 132 transmits a PDU session establishment accept message to the AMF 140 using the N11 interface, and the AMF 140 that has received the PDU session establishment accept message transmits the PDU session establishment accept message to the UE_A 10 using the N1 interface.

Note that in a case that the PDU session is PDN connection, the PDU session establishment accept message may be a PDN connectivity accept message. Furthermore, the PDU session establishment accept message may be a NAS message transmitted and/or received over the N11 interface and the N1 interface. The PDU session establishment accept message is not limited to the PDU session establishment accept message described above, and only needs to be a message indicating the acceptance of the establishment of the PDU session.

The UE_A 10 receives the PDU session establishment accept message from the SMF 132. The UE_A 10 recognizes content of various kinds of identification information included in the PDU session establishment accept message by receiving the PDU session establishment accept message.

Next, the UE_A 10 transmits a PDU session establishment complete message to the SMF 132 via the AMF 140 based on completion of reception of the PDU session establishment accept message (S708). Furthermore, the SMF 132 receives PDU session establishment complete message and performs the second condition fulfillment determination.

Specifically, the UE_A 10 transmits the PDU session establishment complete message to the AMF 140 using the N1 interface, and the AMF 140 that has received the PDU session establishment complete message transmits the PDU session establishment complete message to the SMF 132 using the N11 interface.

Note that in a case that the PDU session is PDN connection, the PDU session establishment complete message may be a PDN Connectivity complete message, or may be an Activate default EPS bearer context accept message. Furthermore, the PDU session establishment complete message may be a NAS message transmitted and/or received over the N1 interface and the N11 interface. The PDU session establishment complete message only needs to be a response message to the PDU session establishment accept message. However, the PDU session establishment complete message is not limited to this, and only needs to be a message indicating that the PDU session establishment procedure is completed.

The second condition fulfillment determination is performed in order for the SMF 132 to determine the type of message over the N4 interface to be transmitted and received. In a case that the second condition fulfillment determination is true, the processing #4 in the core network may be started (S710). Here, the processing #4 in the core network may include transmission and/or reception of a session modification request message, and/or transmission and reception of a session modification response message, and/or the like. The SMF 132 transmits the session modification request message to the UPF 130 and receives the session modification accept message transmitted by the UPF 130 that has received the session modification request message. Also, in a case that the second condition fulfillment determination is false, the SMF 132 performs the processing #2 in the core network. In other words, the SMF transmits a session establishment request message to the UPF 130 and further receives a session modification accept message transmitted by the UPF 130 that has received the session establishment request message.

Each apparatus completes the procedure (A) in the present procedure based on transmission and reception of the PDU session establishment complete message, and/or transmission and reception of the session modification response message, and/or transmission and reception of the session establishment response message, and/or transmission and reception of Router Advertisement (RA).

Next, steps in a case that the third condition fulfillment determination is false, that is, each step in the procedure (B) in the present procedure will be described. The SMF 132 transmits a PDU session establishment reject message to the UE_A 10 via the AMF 140 (S712) and initiates the procedure (B) in the present procedure.

Specifically, the SMF 132 transmits the PDU session establishment reject message to the AMF 140 using the N11 interface, and the AMF 140 that has received the PDU session establishment request message transmits the PDU session establishment reject message to the UE_A 10 using the N1 interface.

Note that in a case that the PDU session is PDN connection, the PDU session establishment reject message may be a PDN Connectivity reject message. Furthermore, the PDU session establishment reject message may be a NAS message transmitted and/or received over the N11 interface and the N1 interface. The PDU session establishment reject message is not limited to the PDU session establishment reject message described above, and only needs to be a message indicating that the PDU session establishment has been rejected.

Here, the SMF 132 may include one or more pieces of identification information among the first to fifth identification information in the PDU session establishment reject message or may indicate that the request from the UE_A 10 has been rejected by including the identification information. Note that two or more pieces of identification information among the identification information may be configured as one or more pieces of identification information.

Moreover, the SMF 132 may indicate that establishment of the PDU session with respect to the NPN has been rejected or that establishment of the PDU session with respect to the NPN is not allowed, by including and transmitting, in the PDU session establishment reject message, the first identification information, and/or the second identification information, and/or the third identification information, and/or the fourth identification information, and/or the fifth identification information.

More specifically, the SMF 132 may indicate that establishment of the PDU session with respect to the NPN has been rejected because the core network is performing DNN-based congestion control, indicate that establishment of the PDU session with respect to the NPN has been rejected, request for an initiation of the DNN-based congestion control, or request for a start of the timer using the value indicated by the fifth identification information by transmitting the first identification information, and/or the second identification information, and/or the fifth identification information.

Alternatively, the SMF 132 may indicate that establishment of the PDU session with respect to the NPN because the core network is performing congestion control based on the combination of the S-NSSAI and the DNN, indicate that establishment of the PDU session with respect to the NPN has been rejected, request for a start of congestion control based on the S-NSSAI and the DNN, or request for a start of the timer using the value indicated by the fifth identification information, by transmitting the first identification information, and/or the third identification information, and/or the fifth identification information.

Alternatively, the SMF 132 may indicate that establishment of the PDU session with respect to the NPN has been performed because the core network is performing the S-NSSAI-based congestion control, request for a start of S-NSSAI-based congestion control, or request for a start of the timer using the value indicated by the fifth identification information, by transmitting the first identification information, and/or the fourth identification information, and/or the fifth identification information.

Moreover, the SMF 132 may request a combination of the above described events by combining and transmitting two or more pieces of identification information among the first to fifth identification information. Note that the events indicated by the SMF 132 through transmission of the identification information may not be limited thereto.

Moreover, the SMF 132 may include identification information other than the first to fifth identification information in the PDU session establishment reject message. For example, the SMF 132 may include the information indicating the NPN in the PDU session establishment reject message. Note that the information indicating the NPN here may be the SNPN ID, may be the S-NSSAI for the NPN, may be the DNN for the NPN, may be the CAG ID, or may be a combination thereof. Note that the information indicating the NPN to be included in the PDU session establishment reject message may be information indicating the NPN that has been received from the UE.

As described above, the core network_B 190 may provide a notification of congestion control to be applied to the UE_A 10 by transmitting the PDU session establishment reject message. Note that in this manner, the core network_B 190 may provide a notification that the congestion control is to be applied to the UE_A 10, and/or a notification that execution of congestion control is to be indicated for the UE_A 10, and/or information for identifying the type of congestion control to be applied, and/or information for identifying the target of congestion control such as the DNN and/or the S-NSSAI corresponding to the congestion control to be applied, and/or the value of the timer associated with the congestion control to be applied.

Note that the core network_B may determine the identification information to be included in the PDU session establishment reject message based on the received identification information, and/or the network capability information, and/or the policy such as an operator policy, and/or the network state.

In a case that the UE is in a state of being registered with the NPN, and/or in a case that the UE requests for connection to the NPN, and/or in a case that the UE is in a state of being connected to the NPN, for example, the core network_B 190 may not perform at least one of the first to fourth congestion control procedures on the UE and/or the combination of the UE and the NPN or may manage the UE and/or the combination of the UE and the NPN such that at least one of the UE and the combination of the UE and the NPN is not to be controlled by the first to fourth congestion controls.

Moreover, in a case that the core network_B 190 has not performed at least one of the first to fourth congestion control procedures on the UE and/or the combination of the UE and the NPN, and/or in a case that the core network_B 190 manages the UE and/or the combination of the UE and the NPN such that at least one of the UE and the combination of the UE and the NPN is not to be controlled by the first to fourth congestion controls, the SMF 132 may not include at least one of the first to fifth identification information in the PDU session establishment reject message.

Specifically, for example, in a case that the core network_B 190 is in a state of not performing the first congestion control on the UE and/or the combination of the UE and the NPN, and/or in a case that the core network_B 190 manages the UE and/or the combination of the UE and the NPN such that at least one of the UE and the combination of the UE and the NPN is not to be controlled by the first congestion control, the SMF 132 may not include, in the PDU session establishment reject message, at least one of the first identification information, the second identification information, and the fifth identification information.

Similarly, for example, in a case that the core network_B 190 is in a state of not performing the second congestion control on the UE and/or the combination of the UE and the NPN, and/or in a case that the core network_B 190 manages the UE and/or the combination of the UE and the NPN such that at least one of the UE and the combination of the UE and the NPN is not to be controlled by the second congestion control, the SMF 132 may not include, in the PDU session establishment reject message, at least one of the first identification information, the fourth identification information, and the fifth identification information.

Similarly, for example, in a case that the core network_B 190 is in a state of not performing the third congestion control on the UE and/or the combination of the UE and the NPN, and/or in a case that the core network_B 190 manages the UE and/or the combination of the UE and the NPN such that at least one of the UE and the combination of the UE and the NPN is not to be controlled by the third congestion control, the SMF 132 may not include, in the PDU session establishment reject message, at least one of the first identification information, the third identification information, and the fifth identification information.

Similarly, in a case that the core network_B 190 is in a state of not performing the fourth congestion control on the UE and/or the combination of the UE and the NPN, and/or in a case that the core network_B 190 manages the UE and/or the combination of the UE and the NPN such that at least one of the UE and the combination of the UE and the NPN is not to be controlled by the fourth congestion control, the SMF 132 may not include, in the PDU session establishment reject message, at least one of the first identification information, the second identification information, the third identification information, the fourth identification information, and the fifth identification information.

In other words, in a case that the UE is registered with the NPN, and/or in a case that information indicating the NPN has been received from the UE, and/or in a case that the UE is in a state of being connected to the NPN, the SMF 132 may not include at least one of the first to fourth identification information in the PDU session establishment reject message.

The PDU session establishment reject message that the UE_A 10 receives from the SMF 132 may include one or more pieces of identification information among the first to fifth identification information.

Next, the UE_A 10 performs fifth processing based on reception of the PDU session establishment reject message (S714). Also, the UE_A 10 may perform the fifth processing based on completion of the present procedure.

Hereinafter, a first example of the fifth processing will be described.

Here, the fifth processing may be processing in which the UE_A 10 ignores events indicated by the SMF 132. Moreover, the fifth processing may be processing in which the UE_A 10 recognizes that the request in the present procedure has been rejected.

Specifically, in the fifth processing, in a case that the UE_A 10 has received the first identification information, and/or the second identification information, and/or the fifth identification information from the core network_B 190, the UE_A 10 may ignore the information and the requests indicated by the first identification information, and/or the second identification information, and/or the fifth identification information and may not perform the first congestion control, based on the state in which the UE_A 10 is registered with the NPN, and/or the state in which the UE_A 10 is connected to the NPN, and/or the fact that the UE_A 10 has transmitted to the network the information indicating the NPN.

Moreover, in the fifth processing, in a case that the UE_A 10 has received the first identification information, and/or the third identification information, and/or the fifth identification information from the core network_B 190, the UE_A 10 may ignore the information and the requests indicated by the first identification information, and/or the third identification information, and/or the fifth identification information and may not perform at least one of the third congestion control and the fourth congestion control, based on the state in which the UE_A 10 is registered with the NPN, and/or the state in which the UE_A 10 is connected to the NPN, and/or the fact that the UE_A 10 has transmitted to the network the information indicating the NPN.

Moreover, in the fifth processing, in a case that the UE_A 10 has received the first identification information, and/or the fourth identification information, and/or the fifth identification information from the core network_B 190, the UE_A 10 may ignore the information and the requests indicated by the first identification information, and/or the fourth identification information, and/or the fifth identification information and may not perform the second congestion control, based on a state in which the UE_A 10 is registered with the NPN, and/or a state in which the UE_A 10 is connected to the NPN, and/or the fact that the UE_A 10 has transmitted to the network the information indicating the NPN.

Here, the fifth processing may be processing in which the UE_A 10 recognizes events indicated by the SMF 132. Moreover, the fifth processing may be processing in which the UE_A 10 stores the received identification information as a context or may be processing in which the received identification information is transferred to the higher layer and/or the lower layer. Moreover, the fifth processing may be processing in which the UE_A 10 recognizes that the request in the present procedure has been rejected.

Note that the UE_A 10 may retransmit the rejected request and retry the PDU session establishment procedure based on completion of the fifth processing.

Next, a second example of the fifth processing will be described.

Here, the fifth processing may be processing in which the UE_A 10 recognizes events indicated by the SMF 132. Moreover, the fifth processing may be processing in which the UE_A 10 stores the received identification information as a context or may be processing in which the received identification information is transferred to the higher layer and/or the lower layer.

Moreover, in the fifth processing, processing of identifying application of congestion control may be performed based on one or more pieces of identification information among the first to fifth identification information.

Moreover, in the fifth processing, processing of identifying which type of congestion control is to be applied among the first to fourth congestion controls and processing of identifying the DNN and/or the S-NSSAI associated with the congestion control to be applied may be performed based on the one or more pieces of identification information among the first to fifth identification information.

Moreover, in the fifth processing, based on one or more pieces of identification information among the first to fifth identification information, a value to be configured in at least one timer among the first to fourth timers indicated by the fifth identification information associated with the congestion control to be applied is identified and configured, and counting of the configured timer may be started.

Specifically, in the fifth processing, in a case that the UE_A 10 has received the first identification information, and/or the second identification information, and/or the fifth identification information from the core network_B 190, the UE_A 10 may configure the value indicated by the fifth identification information in the second timer and start the second timer, based on a state in which the UE_A 10 is registered with the NPN and/or a state in which the UE_A 10 is connected to the NPN. At this time, in the fifth processing, the UE_A 10 may manage the second timer as a timer that is valid for the RPLMN and the EPLMN. In other words, in a case that the UE_A 10 registered with the NPN and/or connected to the NPN is to be registered with a PLMN different from the RPLMN or the EPLMN during execution of counting of the second timer, the UE_A 10 may transition to a state in which transmission of the SM message is allowed or may transition to a state in which a state of the PDU session establishment procedure and/or an initiation of the PDU session management procedure is allowed.

Moreover, in the fifth processing, the UE_A 10 may configure the value indicated by the fifth identification information in the second timer and start the second timer in a case that the UE_A 10 has received the first identification information, and/or the second identification information, and/or the fifth identification information from the core network_B 190 and even in a case that the UE_A 10 is not registered with the NPN. At this time, in the fifth processing, the UE_A 10 may manage the second timer as a timer that is valid for all PLMNs. In other words, during execution of the counting of the second timer, the UE_A 10 that is not registered with the NPN and/or is not connected to the NPN may maintain the second timer even in a case that the PLMN that is a registration destination is modified, may maintain a state in which transmission of the SM message is not allowed, or may maintain a state in which an initiation of the PDU session establishment procedure and/or an initiation of the PDU session management procedure is not allowed.

Moreover, in the fifth processing, in a case that the UE_A 10 has received the first identification information, and/or the third identification information, and/or the fifth identification information from the core network_B 190, the UE_A 10 may configure the value indicated by the fifth identification information in the third timer and may start the third timer based on the state in which the UE_A 10 is registered with the NPN and/or the state in which the UE_A 10 is connected to the NPN. At this time, in the fifth processing, the UE_A 10 may manage the third timer as a timer that is valid for the RPLMN. In other words, in a case that the UE_A 10 registered with the NPN and/or connected to the NPN is to be registered with a PLMN different from the RPLMN, and/or in a case that the UE_A 10 is to be registered with an NPN different from the RNPN, the UE_A 10 may transition to a state in which transmission of the SM message is allowed or may transition to a state in which an initiation of the PDU session establishment procedure and/or an initiation of the PDU session management procedure is allowed.

Moreover, in the fifth processing, in a case that the UE_A 10 has received the first identification information, and/or the fourth identification information, and/or the fifth identification information from the core network_B 190, the UE_A 10 may configure the value indicated by the fifth identification information in the fourth timer and start the fourth timer based on the state in which the UE_A 10 is registered with the NPN and/or a state in which the UE_A 10 is connected to the NPN. At this time, in the fifth processing, the UE_A 10 may manage the fourth timer as a timer that is valid for the RPLMN. In other words, in a case that the UE_A 10 registered with the NPN and/or connected to the NPN is to be registered with a PLMN different from the RPLMN, and/or in a case that the UE_A 10 is to be registered with an NPN different from the RNPN, the UE_A 10 may transition to a state in which transmission of the SM message is allowed or may transition to a state in which an initiation of the PDU session establishment procedure and/or an initiation of the PDU session management procedure is allowed.

Moreover, the fifth processing may be processing in which the UE_A 10 initiates the present procedure again after a specific period or may be processing in which the UE_A 10 transitions to a state in which the request from the UE_A 10 is limited or restricted.

Although the processing content of the fifth processing has been described above using the first example and the second example, the fifth processing may not be limited to the processing. For example, the fifth processing may be processing including a combination of both the processing described in the first example and the processing described in the second example.

Moreover, the UE_A 10 may recognize that the request from the UE_A 10 has been rejected by receiving the PDU session establishment reject message or by not receiving the PDU session establishment accept message. Each apparatus completes the procedure of (B) in the present procedure, based on transmission and/or reception of the PDU session establishment reject message.

Each apparatus completes the present procedure based on completion of the procedure (A) or (B) in the present procedure. Note that each apparatus may transition to a state in which the PDU session is established, based on the completion of the procedure of (A) in the present procedure. Each apparatus may recognize that the present procedure has been rejected, or may transition to a state in which the PDU session is not established, based on the completion of the procedure of (B) in the present procedure.

Furthermore, each apparatus may perform processing based on identification information transmitted and/or received in the present procedure based on completion of the present procedure. In other words, the UE_A 10 may perform the fifth processing based on completion of the present procedure.

The third condition fulfillment determination may be performed based on the identification information included in the PDU session establishment request message, and/or the subscriber information, and/or the operator policy. For example, the third condition fulfillment determination may be true in a case that the network allows the request from the UE_A 10. In addition, the third condition fulfillment determination may be false in a case that the network does not allow the request from the UE_A 10. Moreover, the third condition fulfillment determination may be true in a case that the network that is a connection destination of the UE_A 10 and/or an apparatus in the network supports the function requested by the UE_A 10 and may be false in a case that the network and/or the apparatus does not support the function. Moreover, the third condition fulfillment determination may be true in a case that the network is determined to be in the congestion state and may be false in a case that the network is determined to not be in the congestion state. Note that conditions for determining true or false of the 3rd condition fulfillment determination need not be limited to the conditions described above.

The second condition fulfillment determination may be performed based on whether or not the session over the N4 interface for the PDU session has been established. For example, in a case that the session over the N4 interface for the PDU session has been established, the second condition fulfillment determination may be true, and in a case that the session over the N4 interface for the PDU session is not established, the second condition fulfillment determination may be false. Note that the conditions for determining true or false of the 2nd condition fulfillment determination need not be limited to the conditions described above.

Also, the eleventh condition fulfillment determination may be performed based on the identification information included in the PDU session establishment request message, and/or the subscriber information, and/or the operator policy. For example, the eleventh condition fulfillment determination may be true in a case that the network allows the DN_A 6 to perform authentication and/or approval in the present procedure. Also, the eleventh condition fulfillment determination may be false in a case that the network does not allow the DN_A 6 to perform authentication and/or approval in the present procedure. Moreover, the eleventh condition fulfillment determination may be true in a case that the network that is a connection destination of the UE_A 10 and/or the apparatus in the network supports authentication and/or approval performed by the DN_A 6 in the present procedure and may be false in a case that the network and/or the apparatus does not support the authentication and/or the approval. Moreover, the eleventh condition fulfillment determination may be true in a case that the sixty first identification information has been received and may be false in a case that the sixty first identification information has not been received. In other words, the eleventh condition fulfillment determination may be true in a case that information such as an SM PDU DN Request Container and/or a container including multiple pieces of information has been received and may be false in a case that the information and/or the container has not been received. Note that the condition for determining the true or false of the eleventh condition fulfillment determination may not be limited to the conditions described above.

The core network_B 190 can provide a notification of congestion control to be applied to the UE_A 10 through transmission and reception of the PDU session establishment reject message, and the UE_A 10 can apply the congestion control indicated by the core network_B 190 or ignore the congestion control indicated by the core network_B 190. Note that the core network B 190 and the UE_A 10 may apply multiple congestion controls by executing the procedures and the processing described in the present procedure multiple times. Note that the applied congestion control may be congestion control of different types, and/or congestion control corresponding to different DNNs, and/or congestion control corresponding to different S-NSSAI, and/or congestion control with differences in combinations of the DNN and the S-NSSAI.

3.3. Network-initiated PDU Session Management Procedure

Next, an overview of the network-initiated session management procedure will be described. Hereinafter, the network-initiated session management procedure will also be referred to as a present procedure. The present procedure is a procedure for session management performed on an established PDU session on a network-initiative basis. Note that the present procedure may be performed at any timing after the registration procedure and/or the PDU session establishment procedure described above is completed and each apparatus transitions to a state in which at least one PDU session is established. Also, each apparatus may transmit and/or receive a message including identification information for stopping or modifying congestion control during the present procedure or may start a behavior based on new congestion control indicated by the network based on completion of the present procedure.

Note that the present procedure may be a network-initiated PDU session modification procedure, and/or a network-initiated PDU session release (PDU session release) procedure, and/or the like, or a network-initiated session management procedure that is not limited thereto may be performed. Note that each apparatus may transit and/or receive a PDU session modification message in the network-initiated PDU session modification procedure or may transmit and/or receive a PDU session release message in the network-initiated PDU session release procedure.

Figure 8:
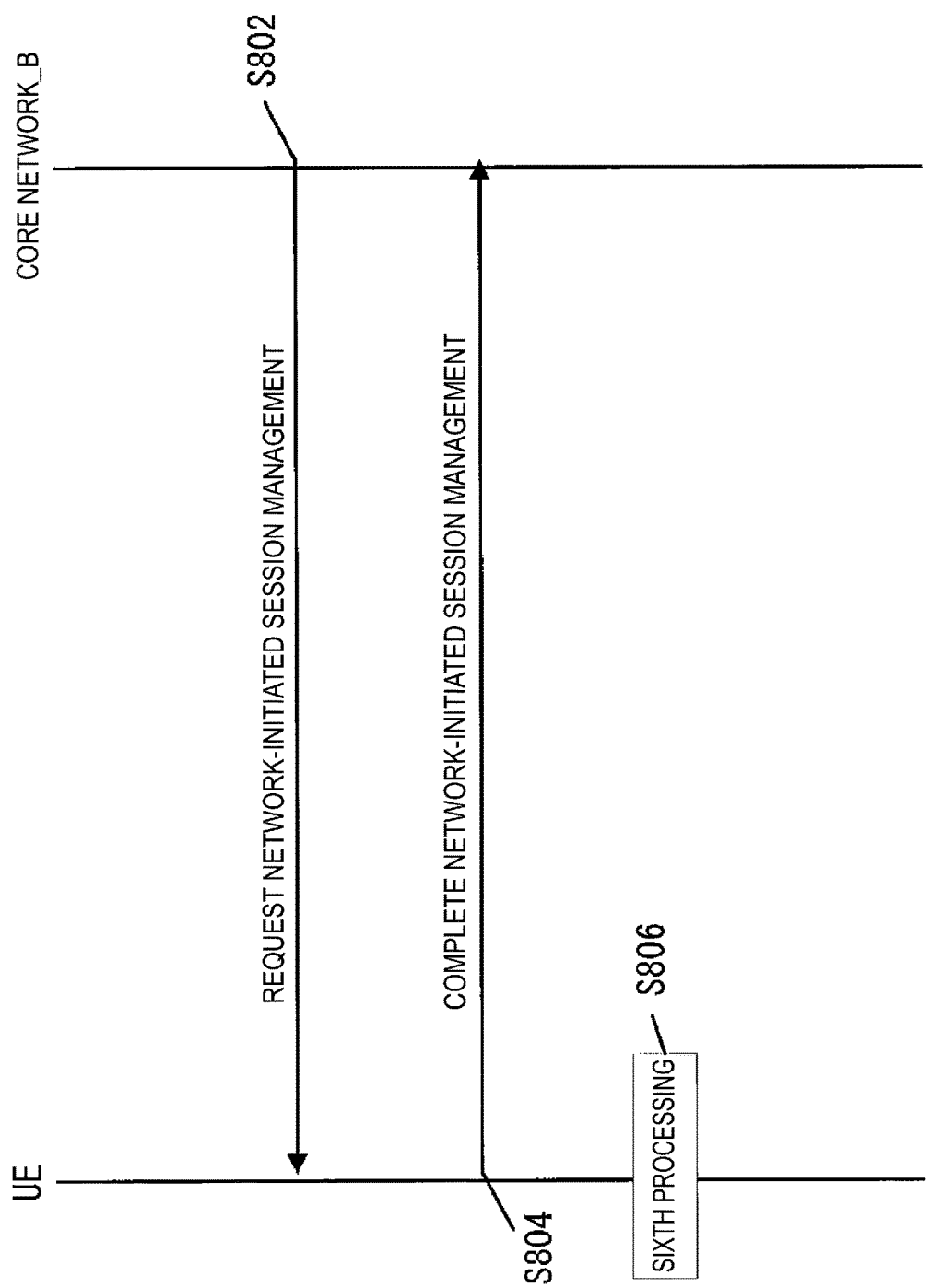
FIG. 8 is a diagram illustrating a network-initiated PDU session management procedure.

An example of the network-initiated session management procedure will be described with reference to FIG. 8. In this chapter, the present procedure refers to the network-initiated session management procedure. Each step of the present procedure will be described below.

As described above, based on completion of the registration procedure and/or the PDU session establishment procedure, the UE_A 10 and each apparatus in the core network_B 190 that have established at least one PDU session initiate the network-initiated session management procedure at any timing. Here, the apparatus in the core network_B 190 that initiates the present procedure may be the SMF and/or the AMF, and the UE_A may transmit and/or receive messages in the present procedure via the AMF and/or over the access network_B.

Specifically, the apparatus in the core network_B 190 transmits a network-initiated session management request message to the UE_A (S802). Here, the apparatus in the core network_B 190 may include one or more pieces of identification information among the eleventh to fifteenth identification information in the network-initiated session management request message or may indicate the request from the core network_B 190 by including the identification information. Note that the two or more pieces of identification information among the identification information may be configured as one or more pieces of identification information.

Moreover, the SMF 132 may indicate that a modification of the PDU session with respect to the NPN is to be requested, that establishment of the PDU session with respect to the NPN has been released, that releasing of establishment of the PDU session with respect to the NPN is to be requested, or that establishment of the PDU session with respect to the NPN is not allowed, by including and transmitting, in the network-initiated session management request message, the eleventh identification information, and/or the twelfth identification information, and/or the thirteenth identification information, and/or the fourteenth identification information, and/or the fifteenth identification information.

More specifically, the SMF 132 may indicate that the management procedure of the PDU session with respect to the NPN has been started because the core network is performing the DNN-based congestion control, request for a start of the DNN-based congestion control, or request for a start of the timer using the value indicated by the fifth identification information, by transmitting the eleventh identification information, and/or the twelfth identification information, and/or the fifteenth identification information.

Alternatively, the SMF 132 may indicate that the management procedure of the PDU session with respect to the NPN has been started because the core network is performing congestion control based on the combination of the S-NSSAI and the DNN, request for a start of the congestion control based on the combination of the S-NSSAI and the DNN, or request for a start of the timer using the value indicated by the fifteenth identification information, by transmitting the eleventh identification information, and/or the thirteenth identification information, and/or the fifteenth identification information.

Alternatively, the SMF 132 may indicate that the management procedure of the PDU session with respect to the NPN has been started because the core network is performing S-NSSAI-based congestion control, request for a start of the S-NSSAI-based congestion control, or request for a start of the timer using the value indicated by the fifteenth identification information, by transmitting the eleventh identification information, and/or the fourteenth identification information, and/or the fifteenth identification information.

Moreover, the SMF 132 may request a combination of the above described events by combining and transmitting two or more pieces of identification information among the eleventh to fifteenth identification information. Note that the events indicated by the SMF 132 through transmission of the identification information may not be limited thereto.

Moreover, the SMF 132 may include identification information other than the eleventh to fifteenth identification information in the network-initiated PDU session management request message. For example, the SMF 132 may include the information indicating the NPN in the network-initiated PDU session management request message. Note that the information indicating the NPN here may be the SNPN ID, may be the S-NSSAI for the NPN, may be the DNN for the NPN, may be the CAG ID, or may be a combination thereof. Note that the information indicating the NPN to be included in the network-initiated PDU session management request message may be information indicating the NPN that has been received from the UE.

As described above, the core network_B 190 may provide a notification of congestion control to be applied to the UE_A 10 by transmitting the network-initiated PDU session management request message. Note that in this manner, the core network_B 190 may provide a notification that congestion control is to be applied to the UE_A 10, and/or a notification that execution of congestion control is to be indicated for the UE_A 10, and/or information for identifying the type of congestion control to be applied, and/or information for identifying the target of congestion control such as the DNN and/or the S-NSSSAI corresponding to the congestion control to be applied, and/or the value of the timer associated with the congestion control to be applied.

Note that the core network_B may determine the identification information to be included in the network-initiated PDU session management request message based on the received identification information, and/or the network capability information, and/or the policy such as an operator policy, and/or the network state.

For example, in a case that the UE is in a state of being registered with the NPN, and/or in a case that the UE requests for connection to the NPN, and/or in a case that the UE is in a state of being connected to the NPN, the core network_B 190 may not perform at least one of the first to fourth congestion control procedures on the UE and/or the combination of the UE and the NPN or may manage the UE and/or the combination of the UE and the NPN such that the UE and/or the combination of the UE and the NPN is not controlled by either of the first to fourth congestion controls.

Moreover, in a case that the core network_B 190 is not performing at least one of the first to fourth congestion control procedures on the UE and/or the combination of the UE and the NPN, and/or in a case that the core network_B 190 manages the UE and/or the combination of the UE and the NPN such that the UE and/or the combination of the UE and the NPN is not controlled by either of the first to fourth congestion controls, the SMF 132 may not include at least one of the first to fourteenth identification information in the network-initiated PDU session management request message.

Specifically, for example, in a case that the core network_B 190 is in a state of not performing the first congestion control on the UE and/or the combination of the UE and the NPN, and/or in a case that the core network_B 190 manages the UE and/or the combination of the UE and the NPN such that the UE and/or the combination of the UE and the NPN is not controlled by the first congestion control, the SMF 132 may not include, in the network-initiated PDU session management request message, at least one of the eleventh identification information, the twelfth identification information, and the fifteenth identification information.

Similarly, in a case that the core network_B 190 is in a state of not performing the second congestion control on the UE and/or the combination of the UE and the NPN, and/or in a case that the core network_B 190 manages the UE and/or the combination of the UE and the NPN such that the UE and/or the combination of the UE and the NPN is not controlled by the second congestion control, the SMF 132 may not include, in the network-initiated PDU session management request message, at least one of the eleventh identification information, the fourteenth identification information, and the fifteenth identification information.

Similarly, for example, in a case that the core network_B 190 is in a state of not performing the third congestion control on the UE and/or the combination of the UE and the NPN, and/or the case that the core network_B 190 manages the UE and/or the combination of the UE and the NPN such that the UE and/or the combination of the UE and the NPN is not controlled by from the third congestion control, the SMF 132 may not include in the network-initiated PDU session management request message, at least one of the eleventh identification information, the thirteenth identification information, and the fifteenth identification information.

Similarly, for example, in a case that the core network_B 190 is in a state of not performing the fourth congestion control on the UE and/or the combination of the UE and the NPN, and/or in a case that the core network_B 190 manages the UE and/or the combination of the UE and the NPN such that the UE and/or the combination of the UE and the NPN is not controlled by from the fourth congestion control, the SMF 132 may not include, in the network-initiated PDU session management request message, at least one of the eleventh identification information, the twelfth identification information, the thirteenth identification information, the fourteenth identification information, and the fifteenth identification information.

In other words, in a case that the UE is in a state of being registered with the NPN, and/or in a case that information indicating the NPN has been received from the UE, and/or in a case that the UE is in a state of being connected to the NPN, the SMF 132 may not include at least one of the eleventh to fifteenth identification information in the network-initiated PDU session management request message.

The network-initiated PDU session management request message received by the UE_A 10 from the SMF 132 may include one or more pieces of identification information among the eleventh to fifteenth identification information.

Next, the UE_A that has received the network-initiated session management request message transmits the network-initiated session management complete message (S804). Moreover, the UE_A may perform the sixth processing (S806) and complete the present procedure based on one or more pieces of identification information among the eleventh to fifteenth identification information received from the core network_B 190. Also, the UE_A 10 may perform the sixth processing based on completion of the present procedure.

Hereinafter, a first example of the sixth processing will be described.

Here, the sixth processing may be processing in which the UE_A 10 ignores the events indicated by the SMF 132. Moreover, the sixth processing may be processing in which the fact that management of the PDU session has been requested is recognized.

Specifically, in the sixth processing, in a case that the UE_A 10 has received the eleventh identification information, and/or the twelfth identification information, and/or the fifteenth identification information from the core network_B 190, the UE_A 10 may ignore the information and the requests indicated by the eleventh identification information, and/or the twelfth identification information, and/or the fifteenth identification information and may not perform the first congestion control based on the state in which the UE_A 10 is registered with the NPN and/or the state in which the UE_A 10 is connected to the NPN.

Moreover, in the sixth processing, in a case that the UE_A 10 has received the eleventh identification information, and/or the thirteenth identification information, and/or the fifteenth identification information from the core network_B 190, the UE_A 10 may ignore the information and the requests indicated by the eleventh identification information, and/or the thirteenth identification information, and/or the fifteenth identification information and may not perform the third congestion control and/or the fourth congestion control based on the state in which the UE_A 10 is registered with the NPN and/or the state in which the UE_A 10 is connected to the NPN.

Moreover, in the sixth processing, in a case that the UE_A 10 has received the eleventh identification information, and/or the fourteenth identification information, and/or the fifteenth identification information from the core network_B 190, the UE_A 10 may ignore the information and the requests indicated by the eleventh identification information, and/or the fourteenth identification information, and/or the fifteenth identification information and may not perform the second congestion control based on the state in which the UE_A 10 is registered with the NPN and/or the state in which the UE_A 10 is connected to the NPN.

Here, the sixth processing may be processing in which the UE_A 10 recognizes the events indicated by the SMF 132. Moreover, the sixth processing may be processing in which the UE_A 10 stores the received identification information as a context or may be processing in which the UE_A 10 transfers the received identification information to the higher layer and/or the lower layer.

Note that the UE_A 10 may retransmit the rejected request and retry the PDU session establishment procedure based on completion of the sixth processing.

Next, a second example of the sixth processing will be described.

Here, the sixth processing may be processing in which the UE_A 10 recognizes the events indicated by the SMF 132. Moreover, the sixth processing may be processing in which the UE_A 10 stores the received identification information as a context or may be processing in which the UE_A 10 transfers the received identification information to the higher layer and/or the lower layer.

Moreover, in the sixth processing, the processing of identifying application of congestion control may be performed based on one or more pieces of identification information among the eleventh to fifteenth identification information.

Moreover, in the sixth processing, processing of identifying what type of congestion control is to be applied among the first to fourth congestion controls based on one or more pieces of identification information among the eleventh to fifteenth identification information and processing of identifying the DNN and/or the S-NSSAI associated with the congestion control to be applied may be performed.

Moreover, in the sixth processing, based on one or more pieces of identification information among the eleventh to fifteenth identification information, a value to be configured in at least one timer among the first to fourth timers indicated by the fifteenth identification information associated with the congestion control to be applied may be identified and configured, and counting of the configured timer may be started.

Specifically, in the sixth processing, in a case that the UE_A 10 has received the eleventh identification information, and/or the twelfth identification information, and/or the fifteenth identification information from the core network_B 190, the UE_A 10 may configure the value indicated by the fifteenth identification information in the second timer and start the second timer based on the state in which the UE_A 10 is registered with the NPN and/or the state in which the UE_A 10 is connected to the NPN. At this time, the UE_A 10 may manage the second timer as a timer that is valid for the RPLMN and the EPLMN in the sixth processing. In other words, in a case that the UE_A 10 registered with the NPN and/or connected to the NPN is to be registered with a PLMN different from the RPLMN or the EPLMN during execution of counting of the second timer, the UE_A 10 may transition to the state in which transmission of the SM message is allowed or the state in which the initiation of the PDU session establishment procedure and/or the initiation of the PDU session management procedure is allowed.

Moreover, in the sixth processing, the UE_A 10 may configure the value indicated by the fifteenth identification information in the second timer and start the second timer in a case that the UE_A 10 has received the eleventh identification information, and/or the twelfth identification information, and/or the fifteenth identification information from the core network_B 190 and even in a case that the UE_A 10 is not registered with the NPN. At this time, in the sixth processing, the UE_A 10 may manage the second timer as a timer that is valid for all PLMNs. In other words, the UE_A 10 that is not registered with the NPN and/or is not connected to the NPN may maintain the second timer even in a case that the PLMN is modified during execution of counting of the second timer, maintain the state in which transmission of the SM message is not allowed, or maintain the state in which the initiation of the PDU session establishment procedure and/or the initiation of the PDU session management procedure is not allowed.

Moreover, in the sixth processing, in a case that the UE_A 10 has received the eleventh identification information, and/or the thirteenth identification information, and/or the fifteenth identification information from the core network_B 190, the UE_A 10 may configure the value indicated by the fifteenth identification information in the third timer and start the third timer based on the state in which the UE_A 10 is registered with the NPN and/or the state in which the UE_A 10 is connected to the NPN. At this time, the UE_A 10 may manage the third timer as a timer that is valid for the RPLMN in the sixth processing. In other words, in a case that the UE_A 10 registered with the NPN and/or connected to the NPN is to be registered with a PLMN different from the RPLMN during counting of the third timer, the UE_A 10 may maintain the state in which transmission of the SM message is not allowed or maintain the state in which the initiation of the PDU session establishment procedure and/or an initiation of the PDU session management procedure is not allowed.

Moreover, in the sixth processing, in a case that the UE_A 10 has received the eleventh identification information, and/or the fourteenth identification information, and/or the fifteenth identification information from the core network_B 190, the UE_A 10 may configure the value indicated by the fifteenth identification information in the fourth timer and start the fourth timer based on the state in which the UE_A 10 is registered with the NPN and/or the state in which the UE_A 10 is connected to the NPN. At this time, the UE_A 10 may manage the fourth timer as a timer that is valid for the RPLMN in the sixth processing. In other words, in a case that the UE_A 10 registered with the NPN and/or connected to the NPN is to be registered with a PLMN different from the RPLMN during execution of the counting of the fourth timer, the UE_A 10 may maintain the state in which transmission of the SM message is not allowed or maintain the state in which the initiation of the PDU session establishment procedure and/or the initiation of the PDU session management procedure is not allowed.

Moreover, the sixth processing may be processing in which the UE_A 10 initiates the present procedure again after a specific period of time or may be processing in which the UE_A 10 transitions to the state in which the request from the UE_A 10 is limited or restricted.

Although the processing content of the sixth processing has been described above using the first example and the second example, the sixth processing may not be limited to such processing. For example, the sixth processing may be processing including a combination of both the processing described in the first example and the processing described in the second example.

Also, the message transmitted and/or received in the network-initiated session management request may be a PDU session modification command (PDU SESSION MODIFICATION COMMAND) or may be a PDU session release command (PDU SESSION RELEASE COMMAND) and is not limited thereto.

Note that the UE_A 10 may perform congestion control identification processing applied by the UE_A 10 based on the received eleventh to fifteenth identification information in the sixth processing.

Furthermore, each apparatus may perform processing based on identification information transmitted and/or received in the present procedure based on completion of the present procedure. In other words, the UE_A 10 may perform the sixth processing based on completion of the present procedure or may complete the present procedure after completion of the sixth processing.

In the aforementioned procedure, the core network_B 190 can indicate to the UE_A 10 to stop or modify the congestion control that has already been applied to the UE_A 10 through transmission and/or reception of the network-initiated session management request message. Moreover, the UE_A 10 can stop or modify the congestion control that has been applied to the UE_A 10 based on the network-initiated session management request message. Here, in a case that the UE_A 10 has applied one or more congestion controls, the congestion control to be stopped or modified may be identified based on reception of the identification information included in the network-initiated session management request message from the core network_B 190. Note that each congestion control to be applied may be congestion control of different types, and/or congestion control corresponding to different DNNs, and/or congestion control corresponding to different S-NNSAI, and/or congestion control with differences in combinations of the DNNs and the S-NSSAIs.

3.4. UE-initiated PDU Session Management

Next, an overview of the UE-initiated session management procedure will be described. Hereinafter, the UE-initiated session management procedure will also be referred to as a present procedure. The present procedure is a procedure for session management performed on a UE initiative based on the established PDU session. Note that the present procedure may be performed at any timing after the aforementioned registration procedure and/or the PDU session establishment procedure is completed and the state in which each apparatus transitions to a state where at least one PDU session has been established. Moreover, the UE may initiate the present procedure in a case that counting of at least one timer from among the first to fourth timers that are being performed is completed. Also, each apparatus may transmit and/or receive a message including identification information for stopping or modifying congestion control during the present procedure or may start a behavior based on new congestion control indicated by the network based on completion of the present procedure.

Note that the present procedure may be a UE-initiated PDU session modification procedure or may perform a network-initiated session management procedure that is not limited thereto. Note that each apparatus may transmit and/or receive the PDU session modification request message and/or the PDU session modification reject message in the UE-initiated PDU session modification procedure.

Figure 9:
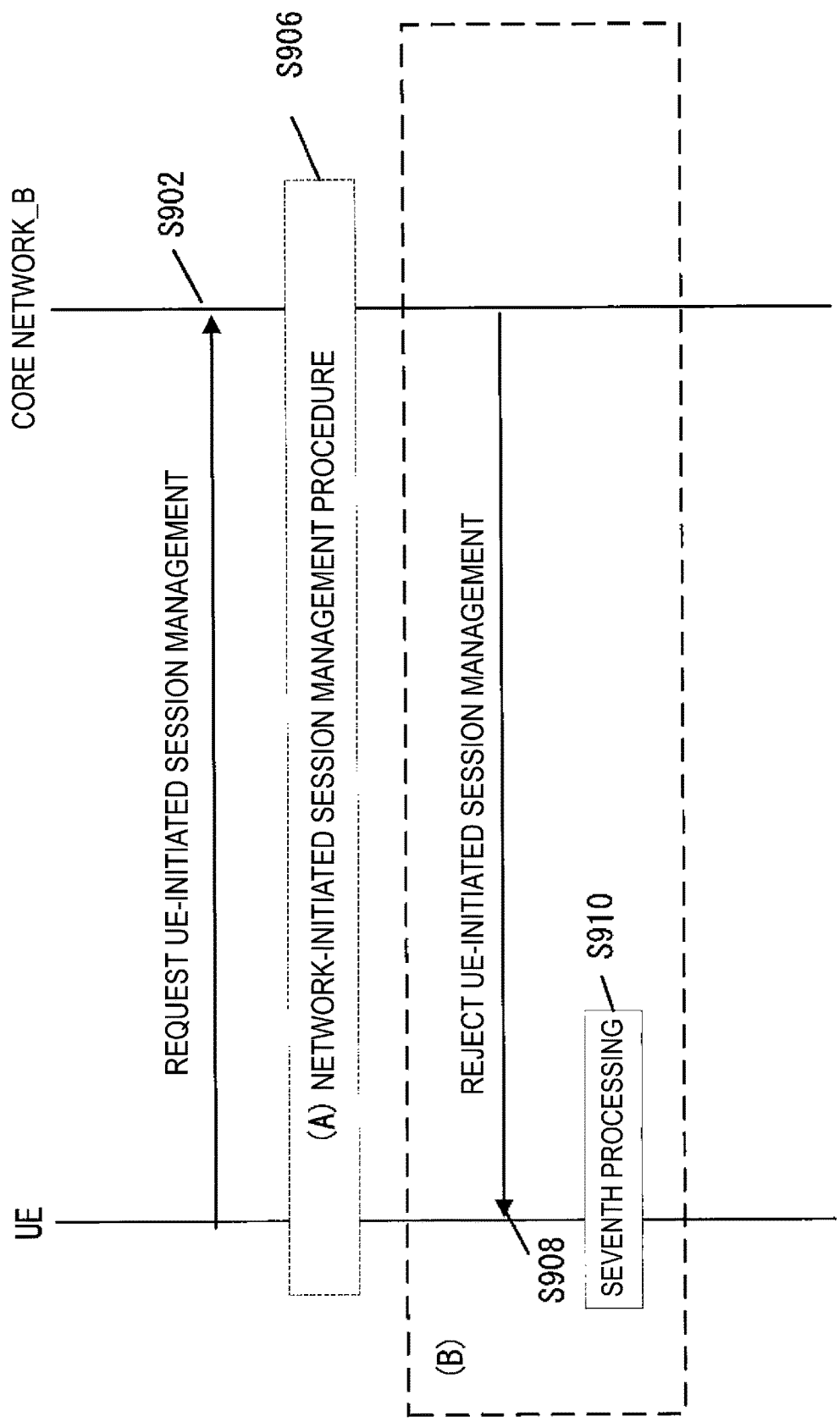
FIG. 9 is a diagram illustrating a UE-initiated PDU session management procedure.

An example of the UE-initiated session management procedure will be described with reference to FIG. 9. In this chapter, the present procedure refers to the UE-initiated session management procedure. Each step of the present procedure will be described below. As described above, the UE_A 10 and each apparatus in the core network_B 190 that has established at least one PDU session initiate the UE-initiated session management procedure at any timing based on completion of the registration procedure and/or the PDU session establishment procedure. Here, the present procedure may be started by the UE_A 10, and the UE_A 10 may transmit and/or receive messages in the present procedure via the AMF and/or over the access network_B.

Specifically, the UE_A 10 transmits a UE-initiated PDU session management request message to the AMF 140 in the core network_B 190 via the NR node_A 122 using the N1 interface (S902). In a case that the present procedure is the UE-initiated PDU session modification procedure, the UE-initiated PDU session management request message may be a PDU session modification request (PDU SESSION MODIFICATION REQUEST) message.

Here, the UE_A 10 may include information indicating the NPN in the PDU session management request message or may indicate that the UE_A 10 requests the connection to the NPN by including the information indicating the NPN. Note that the information indicating the NPN may be the SNPN ID, may be the S-NSSAI for the NPN, may be the DNN for the NPN, may be the CAG ID, or may be a combination thereof. Note that two or more pieces of identification information among the identification information may be configured as one or more pieces of identification information, or one piece of identification information may be configured by two or more pieces of identification information.

The AMF receives the PDU session management request message and performs third condition fulfillment determination. The third condition fulfillment determination is performed in order for the AMF to determine whether or not to accept the request from the UE_A 10. The core network_B initiates the network-initiated session management procedure (A) in a case that the third condition fulfillment determination is true (S906) or starts the procedure (B) in the present procedure in a case that the third condition fulfillment determination is false. Note that the network-initiated session management procedure (A) in the case that the third condition fulfillment determination is true may be the network-initiated PDU session management procedure described above.

Next, steps in a case that the third condition fulfillment determination is false, that is, each step in the procedure (B) in the present procedure will be described. The SMF 132 transmits a UE-initiated PDU session management reject message to the UE_A 10 via the AMF 140 (S908) and initiates the procedure (B) in the present procedure. In a case that the present procedure is the UE-initiated PDU session modification procedure, the UE-initiated PDU session management reject message may be a PDU session modification reject (PDU SESSION MODIFICATION REJECT) message.

Specifically, the SMF 132 transmits the UE-initiated PDU session management reject message to the AMF 140 using the N11 interface, and the AMF 140 that has received the UE-initiated PDU session management request message transmits the UE-initiated PDU session management reject message to the UE_A 10 using the N1 interface.

Here, the SMF 132 may include one or more pieces of identification information among the twenty first to twenty fifth identification information in the PDU session management reject message or may indicate that the request from the UE_A 10 has been rejected by including the identification information. Note that two or more pieces of identification information among these pieces of identification information may be configured as one or more pieces of identification information.

In addition, SMF 132 may indicate that the establishment of the PDU session with respect to the NPN has been rejected, indicate that the establishment of the PDU session with respect to the NPN is not allowed, indicate that the modification of the PDU session with respect to the NPN has been rejected, or indicate that the modification of the PDU session with respect to the NPN is not allowed, by including and transmitting, in the PDU session management reject message, the twenty first identification information, and/or the twenty second identification information, and/or the twenty third identification information, and/or the twenty fourth identification information, and/or the twenty fifth identification information.

More specifically, the SMF 132 may indicate that the establishment and/or the modification of the PDU session with respect to the NPN has been rejected because the core network is performing the DNN-based congestion control, request for a start of DNN-based congestion control, or may request for a start of the timer using a value indicated by the twenty fifth identification information, by transmitting the twenty first identification information, and/or the twenty second identification information, and/or the twenty fifth identification information.

Alternatively, the SMF 132 may indicate that the establishment and/or the modification of the PDU session with respect to the NPN has been rejected because the core network is performing congestion control based on the combination of the S-NSSAI and the DNN, request for a start of congestion control based on the combination of the S-NSSAI and the DNN, or request for a start of the timer using the value indicated by the twenty fifth identification information, by transmitting the twenty first identification information, and/or the twenty third identification information, and/or the twenty fifth identification information.

Alternatively, the SMF 132 may indicate that the establishment and/or the modification of the PDU session with respect to the NPN has been rejected because the core network is performing the S-NSSAI-based congestion control, request for a start of the S-NSSAI-based congestion control, or may request for a start of the timer using a value indicated by the twenty fifth identification information, by transmitting the twenty first identification information, and/or the twenty fourth identification information, and/or the twenty fifth identification information.

Moreover, the SMF 132 may request a combination of the above described events by combining and transmitting two or more pieces of identification information among the twenty first to twenty fifth identification information. Note that the events indicated by the SMF 132 through the transmission of each piece of identification information may not be limited thereto.

Moreover, the SMF 132 may include identification information other than the twenty first to twenty fifth identification information in the PDU session management reject message. For example, the SMF 132 may include the information indicating the NPN in the PDU session management reject message. Note that the information indicating the NPN here may be the SNPN ID, may be the S-NSSAI for the NPN, may be the DNN for the NPN, may be the CAG ID, or may be a combination thereof. Note that the information indicating the NPN to be included in the PDU session management reject message may be the information indicating the NPN received from the UE.

As described above, the core network_B 190 may provide a notification of the congestion control to be applied to the UE_A 10 by transmitting the PDU session management reject message. Note that in this manner, the core network_B 190 may indicate that congestion control is to be applied to the UE_A 10 and/or indicate to the UE_A 10 that congestion control is to be performed, and/or provide a notification of information for identifying the type of congestion control to be applied, and/or information for identifying a target of congestion control such as the DNN and/or the S-NSSAI or the like corresponding to the congestion control to be applied, and/or a value of the timer associated with the congestion control to be applied.

Note that the core network_B may determine the identification information to be included in the PDU session management reject message based on the received identification information, and/or the network capability information, and/or a policy such as an operator policy, and/or a network state.

For example, in a case that the UE is in a state of being registered with the NPN, and/or in a case that the UE requests for connection to the NPN, and/or in a case of that the UE is in a state of being connected to the NPN, the core network_B 190 may not perform at least one of the first to fourth congestion control procedures on the UE and/or the combination of the UE and the NPN or may manage the UE and/or the combination of the UE and the NPN such that the UE and/or the combination of the UE and the NPN is not controlled by either of the first to fourth congestion controls.

Moreover, in a case that the core network_B 190 does not perform at least one of the first to fourth congestion control procedures on the UE and/or the combination of the UE and the NPN and/or in a case that the UE and/or the combination of the UE and the NPN is managed such that the UE and/or the combination of the UE and the NPN is not controlled by either of the first to fourth congestion controls, the SMF 132 may not include at least one of the twenty first to twenty fifth identification information in the PDU session management reject message.

Specifically, for example, in a case that the core network_B 190 is in a state of not performing the first congestion control on the UE and/or the combination of the UE and the NPN, and/or in a case that the UE and/or the combination of the UE and the NPN is managed such that the UE and/or the combination of the UE and the NPN is not controlled by from the first congestion control, the SMF 132 may not include, in the PDU session management reject message, the twenty first identification information, and/or the twenty second identification information, and/or the twenty fifth identification information.

Similarly, for example, in a case that the core network_B 190 is in a state of not performing the second congestion control on the UE and/or the combination of the UE and the NPN, and/or in a case that the UE and/or the combination of the UE and the NPN is managed such that the UE and/or the combination of the UE and the NPN is not controlled by the second congestion control, the SMF 132 may not include the twenty first identification information, and/or the twenty fourth identification information, and/or the twenty fifth identification information in the PDU session management reject message.

Similarly, for example, in a case that the core network_B 190 is in a state of not performing the third congestion control and/or the fourth congestion control on the UE and/or the combination of the UE and the NPN, and/or in a case that the UE and/or the combination of the UE and the NPN is managed such that the UE and/or the combination of the UE and the NPN is not controlled by either the third congestion control or the fourth congestion control, the SMF 132 may not include, in the PDU session management reject message, the twenty first identification information, and/or the twenty third identification information, and/or the twenty fifth identification information.

In other words, in a case that the UE is registered with the NPN and/or in a case that the information indicating the NPN has been received from the UE, and/or in a case that the UE is in a state of being connected to the NPN, the SMF 132 may not include at least one of the twenty first to twenty fourth identification information in the PDU session management reject message even in a case that the first to fourth congestion controls have been detected.

The PDU session management reject message received from the SMF 132 by the UE_A 10 may include one or multiple pieces of identification information among the twenty first to twenty fifth identification information.

Next, the UE_A 10 performs the seventh processing based on reception of the PDU session management reject message (S910). Also, the UE_A 10 may perform the seventh processing based on completion of the present procedure.

Hereinafter, a first example of the seventh processing will be described.

Here, the seventh processing may be processing in which the UE_A 10 ignores the events indicated by the SMF 132. Moreover, the seventh processing may be processing in which the UE_A 10 recognizes that the request of the present procedure has been rejected.

Specifically, in the seventh processing, in a case that the UE_A 10 has received the twenty first identification information, and/or the twenty second identification information, and/or the twenty fifth identification information from the core network_B 190, the UE_A 10 may ignore information and requests indicated by the twenty first identification information, and/or the twenty second identification information, and/or the twenty fifth identification information and may not perform the first congestion control based on the state in which the UE_A 10 is registered with the NPN, and/or the state in which the UE_A 10 is connected to the NPN, and/or the fact that the UE_A 10 has transmitted to the network the information indicating the NPN.

Moreover, in the seventh processing, in a case that the UE_A 10 has received the twenty first identification information, and/or the twenty third identification information, and/or the twenty fifth identification information from the core network_B 190, the UE_A 10 may ignore the information and the requests indicated by the twenty first identification information, and/or the twenty third identification information, and/or the twenty fifth identification information and may not perform the third congestion control and/or the fourth congestion control based on the state in which the UE_A 10 is registered with the NPN, and/or the state in which the UE_A 10 is connected to the NPN, and/or the fact that the UE_A 10 has transmitted to the network the information indicating the NPN.

Moreover, in the seventh processing, in a case that the UE_A 10 has received the twenty first identification information, and/or the twenty fourth identification information, and or the twenty fifth identification information from the core network_B 190, the UE_A 10 may ignore the information and the requests indicated by the twenty first identification information, and/or the twenty fourth identification information, and/or the twenty fifth identification information and may not perform the second congestion control based on the state in which the UE_A 10 is registered with the NPN, and/or the state in which the UE_A 10 is connected to the NPN, and/or the fact that the UE_A 10 has transmitted to the network the information indicating the NPN.

Here, the seventh processing may be processing in which the UE_A 10 recognizes the events indicated by the SMF 132. Moreover, the seventh processing may be processing in which the UE_A 10 stores the received identification information as a context or may be processing in which the UE_A 10 transfers the received identification information to the higher layer and/or the lower layer. Moreover, the seventh processing may be processing in which the UE_A 10 recognizes that the request for the present procedure has been rejected.

Note that the UE_A 10 may retransmit the rejected request and retry the PDU session management procedure based on completion of the seventh processing.

Next, a second example of the seventh processing will be described.

Here, the seventh processing may be processing in which the UE_A 10 recognizes the events indicated by the SMF 132. Moreover, the seventh processing may be processing in which the UE_A 10 stores the received identification information as a context or may be processing in which the UE_A 10 transfers the received identification information to the higher layer and/or the lower layer.

Moreover, in the seventh processing, processing of identifying application of congestion control may be performed based on one or more pieces of identification information among the twenty first to twenty fifth identification information.

Moreover, in the seventh processing, based on one or more pieces of identification information among the twenty first to twenty fifth identification information, processing of identifying which type of congestion control is to be applied from among the first to fourth congestion controls and processing of identifying the DNN and/or the S-NSSAI associated with the congestion control to be applied may be performed.

Furthermore, in the seventh processing, based on one or more pieces of identification information among the twenty first to twenty fifth identification information, a value to be configured in at least one timer among the first to fourth timers indicated by the twenty fifth identification information associated with the congestion control to be applied may be identified and configured, and counting of the configured timer may be started.

Specifically, in the seventh processing, in a case that the UE_A 10 has received the twenty first identification information, and/or the twenty second identification information, and/or the twenty fifth identification information from the core network_B 190, the UE_A 10 may configure the value indicated by the twenty fifth identification information in the second timer and start the second timer based on the state in which the UE_A 10 is registered with the NPN and/or the state in which the UE_A 10 is connected to the NPN. At this time, the UE_A 10 may manage the second timer as a timer that is valid for the RPLMN and the EPLMN in the seventh processing. In other words, in a case that the UE_A 10 registered with the NPN and/or connected to the NPN is to be registered with a PLMN different from the RPLMN or the EPLMN during execution of the counting of the second timer, the UE_A 10 may transition to a state in which transmission of the SM message is allowed or may transition to a state in which an initiation of the PDU session establishment procedure and/or an initiation of the PDU session management procedure is allowed.

Moreover, in the seventh processing, the UE_A 10 may configure the value indicated by the twenty fifth identification information in the second timer and start the second timer in a case that the UE_A 10 has received the twenty first identification information, and/or the twenty second identification information, and/or the twenty fifth identification information from the core network_B 190 and even in a case that the UE_A 10 is not registered with the NPN. At this time, the UE_A 10 may manage the second timer as a timer that is valid for all PLMNs in the seventh processing. In other words, the UE_A 10 that is not registered with the NPN and/or is not connected to the NPN may maintain the second timer even in a case that the PLMN is modified during execution of the counting of the second timer, maintain the state in which transmission of the SM message is not allowed, or maintain the state in which the initiation of the PDU session establishment procedure and/or the initiation of the PDU session management procedure is not allowed.

Moreover, in the seventh processing, the UE_A 10 may configure the value indicated by the twenty fifth identification information in the third timer and start the third timer based on the state in which the UE_A 10 is registered with the NPN and/or the state in which the UE_A 10 is connected to the NPN in a case that the UE_A 10 has received the twenty first identification information, and/or the twenty third identification information, and/or the twenty fifth identification information from the core network_B 190. At this time, the UE_A 10 may manage the third time as a timer that is valid for the RPLMN in the seventh processing. In other words, in a case that the UE_A 10 registered with the NPN and/or connected to the NPN is to be registered with a PLMN different from the RPLMN, the UE_A 10 may transition to a state in which transmission of the SM message is allowed or a state in which an initiation of the PDU session establishment procedure and/or an initiation of the PDU session management procedure is allowed.

Moreover, in the seventh processing, in a case that the UE_A 10 has received the twenty first identification information, and/or the twenty fourth identification information, and/or the twenty fifth identification information from the core network_B 190, the UE_A 10 may configure the value indicated by the twenty fifth identification information in the fourth timer and start the fourth timer based on the state in which the UE_A 10 is registered with the NPN and/or the state in which the UE_A 10 is connected to the NPN. At this time, the UE_A 10 may manage the fourth timer as a timer that is valid for the RPLMN in the seventh processing. In other words, in a case that the UE_A 10 registered with the NPN and/or connected to the NPN is registered with a PLMN different from the RPLMN, the UE_A 10 may transition to a state in which transmission of the SM message is allowed or a state in which an initiation of the PDU session establishment procedure and/or an initiation of the PDU session management procedure is allowed.

Moreover, the seventh processing may be processing in which the UE_A 10 initiates the present procedure again after a specific period of time or may be processing in which the UE_A 10 transitions to a state where the request from the UE_A 10 is limited or restricted.

Although the processing content of the seventh processing has been described using the first example and the second example hitherto, the seventh processing may not be limited to such processing. For example, the seventh processing may be processing including a combination of both the processing described in the first example and the processing described in the second example.

Moreover, the UE_A 10 may recognize that the request from the UE_A 10 has been rejected by receiving the PDU session management reject message or by not receiving the UE-initiated PDU session management request message. Each apparatus completes the procedure (B) in the present procedure based on transmission and/or reception of the PDU session management reject message.

Each apparatus completes the present procedure, based on completion of the procedure of (A) or (B) in the present procedure. Note that each apparatus may transition to a state in which the PDU session is established, based on the completion of the procedure of (A) in the present procedure. Each apparatus may recognize that the present procedure has been rejected, or may transition to a state in which the PDU session is not established, based on the completion of the procedure of (B) in the present procedure.

Furthermore, each apparatus may perform processing based on identification information transmitted and/or received in the present procedure, based on completion of the present procedure. In other words, the UE_A 10 may perform the seventh processing based on completion of the present procedure.

Also, the third condition fulfillment determination may be performed based on the identification information included in the PDU session management request message and/or subscriber information, and/or the operator policy. For example, the third condition fulfillment determination may be true in a case that the network allows the request from the UE_A 10. In addition, the third condition fulfillment determination may be false in a case that the network does not allow the request from the UE_A 10. Furthermore, the third condition fulfillment determination may be true in a case that the network as a connection destination of the UE_A 10 and/or the apparatuses in the network support the functions requested by the UE_A 10, and the third condition fulfillment determination may be false in a case that the network and/or the apparatuses do not support the functions. Moreover, the third condition fulfillment determination may be true in a case that the network is determined to be in a congestion state, and the third condition fulfillment determination may be false in a case that the network is determined to not be in the congestion state. Note that the conditions for determining true or false of the third condition fulfillment determination need not be limited to the conditions described above.

The core network_B 190 can provide a notification of congestion control to be applied to the UE_A 10, and the UE_A 10 can apply the congestion control indicated by the core network_B 190 or ignore the congestion control indicated by the core network_B 190, through transmission and/or reception of the PDU session management reject message in the procedure described above. Note that the core network B 190 and the UE_A 10 may apply multiple congestion controls by executing the procedures and the processing described in the present procedure multiple times. Note that each congestion control to be applied may be congestion control of different types, and/or congestion control corresponding to different DNNs, and/or congestion control corresponding to different S-NNSAIs, and/or congestion control with differences in combinations of the DNNs and the S-NSSAIs.

4. Description of Embodiments

Hereinafter, first and second embodiments will be described. Note that the first and second embodiments are examples of the present invention. In other words, the embodiments illustrating the present invention are not limited to the first and second embodiments and may be a combination of one or more procedures described in Chapter 3.

4.1. Description of First Embodiment

First, the first embodiment will be described. The first embodiment includes the registration procedure and the PDU session establishment procedure. Note that the above description is to be referred to for details of the registration procedure and the PDU session establishment procedure in the present embodiment.

In the first embodiment, the UE_A 10 initiates the registration procedure first. The UE_A 10 and each apparatus transition to a state of being registered with the NPN, and/or a state of being allowed to connect to the NPN, and/or a state of being connected to the NPN, based on completion of the registration procedure. Specifically, the UE_A 10 and each apparatus transition to the state of being registered with the NPN, or the state of being allowed to connect to the NPN, and/or the state of being connected to the NPN, by receiving a registration accept message from the AMF 140.

Moreover, the UE_A 10 initiates the PDU session establishment procedure based on completion of the registration procedure. The UE_A 10 may request for establishment of the PDU session with respect to the NPN by transmitting information indicating the NPN to the core network_B 190.

The UE_A 10 receives, from the core network_B 190, a PDU session establishment reject message as a response to the PDU session establishment request message. Note that the PDU session establishment reject message may include at least one of the first to fifth identification information.

The UE_A 10 ignores the request from the core network_B 190 and does not start congestion control indicated by the identification information received from the core network_B 190 based on the state in which the UE_A 10 is registered with the NPN, and/or the state in which the UE_A 10 is connected to the NPN, and/or the fact that the UE_A 10 has requested the PDU session management procedure with respect to the NPN. In other words, the UE_A 10 ignores the request for a start of congestion control indicated by the core network_B 190 and does not start the corresponding congestion control.

The UE_A 10 that does not start the congestion control can perform the PDU session establishment procedure by successively retransmitting the PDU session establishment request message.

As described above, the UE_A 10 and each apparatus do not enable the congestion control procedure for the UE connected to the NPN. In other words, the UE_A 10 and each apparatus can handle, through the present procedure, the UE connected to the NPN such that the UE is not controlled by the congestion control procedure.

4.2. Description of Second Embodiment

Next, the second embodiment will be described. The second embodiment includes the first registration procedure, the PDU session establishment procedure, and the second registration procedure. Note that the registration procedure described above is to be referred to for details of the first registration procedure and the second registration procedure in the present embodiment and the PDU session establishment procedure described above is to be referred to for details of the PDU session establishment procedure in the present embodiment.

In the second embodiment, the UE_A 10 initiates the first registration procedure. The UE_A 10 and each apparatus transition to a state of being connected to the NPN based on completion of the first registration procedure. Specifically, the UE_A 10 and each apparatus transition to the state of being registered with the NPN or the state of being allowed to connect to the NPN, by receiving a PDU session accept message from the AMF 140.

Moreover, the UE_A 10 initiates the PDU session establishment procedure based on completion of the registration procedure. The UE_A 10 requests for establishment of a PDU session with respect to the NPN by transmitting information indicating the NPN to the core network_B 190.

The UE_A 10 receives, from the core network_B 190, a PDU session establishment reject message as a response to the PDU session establishment request message. Note that the PDU session establishment reject message may include at least one of the first to fifth identification information.

The UE_A 10 initiates the congestion control procedure based on the request from the core network_B 190. Specifically, the UE_A 10 may perform the second congestion control based on the first identification information, and/or the second identification information, and/or the fifth identification information.

The UE_A 10 moves out from the RPLMN and/or the RSNPN during execution of the congestion control and initiates the second registration procedure for another PLMN. The UE_A 10 may stop the congestion control based on the fact that the PLMN selected by the UE is not the RPLMN and the RSNPN and the EPLMN in the second registration procedure.

As described above, in a case that the UE is connected to the NPN, the UE_A 10 and each apparatus may enable the congestion control and/or the timer associated with the congestion control for the registered PLMN and/or the registered SNPN and/or the equivalent PLMN, transition to a state in which transmission of the SM message is allowed, or transition to a state in which an initiation of the PDU session establishment procedure and/or an initiation of the PDU session management procedure is allowed.

In other words, in a case that the UE is connected to the NPN, and is to be connected to a PLMN different from the PLMN with which the UE is registered and the equivalent PLMN, or is to be connected to an NPN different from the NPN with which the UE is registered, the UE_A 10 and each apparatus may disable or stop the congestion control and/or the timer associated with the congestion control for the registered PLMN, and/or the registered SNPN, and/or the equivalent PLMN, maintain the state in which the transmission of the SM message is not allowed, or maintain the state in which the initiation of the PDU session establishment procedure and/or the initiation of the PDU session management procedure is not allowed.

EMBODIMENTS

The User Equipment (UE; terminal apparatus) according to an embodiment of the present invention includes a transmission and reception unit, and in a case that the transmission and reception unit is connected to a Non-Public Network (NPN) and receives a twenty sixth 5G Session Management (5GSM) cause value, the transmission and reception unit ignores the twenty sixth 5GSM cause value.

The User Equipment (UE; terminal apparatus) according to an embodiment of the present invention includes a transmission and reception unit, and in a case that the transmission and reception unit is connected to a Non-Public Network (NPN) and receives a sixty seventh 5G Session Management (5GSM) cause value, the transmission and reception unit ignores the sixty seventh 5GSM cause value.

The User Equipment (UE; terminal apparatus) according to an embodiment of the present invention includes a transmission and reception unit, and in a case that the transmission and reception unit is connected to a Non-Public Network (NPN) and receives a sixty ninth 5G Session Management (5GSM) cause value, the transmission and reception unit ignores the sixty ninth 5GSM cause value.

The User Equipment (UE; terminal apparatus) according to an embodiment of the present invention includes a controller and a transmission and reception unit, wherein the UE is connected to a Non-Public Network (NPN), the controller starts a back-off timer associated with a Data Network Name (DNN), the back-off timer is applied to a first Public Land Mobile Network (PLMN) and a second PLMN, the first PLMN is a PLMN with which the UE is registered, and the second PLMN is an equivalent PLMN.

5. Modified Examples

A program running on an apparatus according to the present invention may serve as a program that controls a Central Processing Unit (CPU) and the like to cause a computer to operate in such a manner as to realize the functions of the aforementioned embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing the functions of the embodiments according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various features of the apparatuses used in the aforementioned embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The aforementioned electric circuit may include a digital circuit or may include an analog circuit. In a case that with advances in semiconductor technology, a circuit integration technology appears that replaces the present integrated circuits, one or multiple aspects of the present invention are also possible to use a new integrated circuit based on the technology.

Note that the invention of the present application is not limited to the aforementioned embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope not departing from the gist of the present invention. Furthermore, in the present invention, various modifications are possible within the scope of claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

REFERENCE SIGNS LIST

1 Mobile communication system
10 UE_A
30 PGW-U
32 PGW-C
35 SGW
40 MME
45 eNB
50 HSS
60 PCRF
80 Access network_A (E-UTRAN)
90 Core network_A
120 Access network_B (5G AN)
122 gNB
130 UPF
132 SMF
140 AMF
150 UDM
160 PCF
190 Core network_B

The invention claimed is:

1. A User Equipment (UE) comprising:
a controller; and
a transmission and reception circuitry, wherein
the transmission and reception circuitry receives a 5G session management (5GSM) cause value #26 to start a timer T3396 for a Data Network Name (DNN) based congestion control, and receives a back-off timer value,
the controller is configured to start the timer T3396 with the back-off timer value,
the 5GSM cause value #26 indicates insufficient resources, and
the timer T3396 is started on a per DNN and Stand-alone Non-Public Network (SNPN) basis after determining that the UE is in an SNPN.

2. A communication control method performed by a User Equipment (UE), the communication control method comprising:
receiving a 5G session management (5GSM) cause value #26 to start a timer T3396 for a Data Network Name (DNN) based congestion control, and receiving a back-off timer value; and
starting the timer T3396 with the back-off timer value, wherein
the 5GSM cause value #26 indicates insufficient resources, and the timer T3396 is started on a per DNN and Stand-alone Non-Public Network (SNPN) basis after determining that the UE is in an SNPN.

* * * * *